United States Patent
Koyama

(10) Patent No.: US 12,533,926 B2
(45) Date of Patent: Jan. 27, 2026

(54) TEMPERATURE CONTROL SYSTEM

(71) Applicant: HONDA MOTOR CO., LTD., Tokyo (JP)

(72) Inventor: Shigeru Koyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 18/439,071

(22) Filed: Feb. 12, 2024

(65) Prior Publication Data

US 2024/0270045 A1 Aug. 15, 2024

(30) Foreign Application Priority Data

Feb. 15, 2023 (JP) .................. 2023-021802

(51) Int. Cl.
*B60H 1/00* (2006.01)
*B60H 1/14* (2006.01)
(Continued)

(52) U.S. Cl.
CPC ........... *B60H 1/00278* (2013.01); *B60H 1/00* (2013.01); *B60H 1/00485* (2013.01);
(Continued)

(58) Field of Classification Search
CPC .. B60H 1/00278; B60H 1/00; B60H 1/00485; B60H 1/00885; B60H 1/00921;
(Continued)

(56) References Cited

U.S. PATENT DOCUMENTS 9,395,107 B2 * 7/2016 Asari ................. F25B 7/00
9,527,403 B2 * 12/2016 Mardall ............. B60L 53/35
(Continued)

FOREIGN PATENT DOCUMENTS

CN 104602927 B * 9/2016 ............ B60L 58/26
CN 105121192 B * 12/2017 ............ B60L 58/26
(Continued)

*Primary Examiner* — Ljiljana V. Ciric
(74) *Attorney, Agent, or Firm* — Paratus Law Group, PLLC

(57) ABSTRACT

A battery temperature control system includes a battery temperature control circuit, a high temperature refrigerant circuit radiating heat from a refrigerant, a low temperature refrigerant circuit absorbing heat into the refrigerant, a refrigeration cycle circuit used for an air conditioner of the vehicle, a first valve mechanism switching between a high connection state where the battery temperature control circuit and the high temperature refrigerant circuit communicate with each other and a high disconnection state where those circuits are disconnected, a second valve mechanism switching between a low connection state where the battery temperature control circuit and the low temperature refrigerant circuit communicate with each other and a low disconnection state where those circuits are disconnected, a first heat exchanger transferring heat from the low temperature refrigerant circuit to the refrigeration cycle circuit, and a second heat exchanger transferring heat from the refrigeration cycle circuit to the high temperature refrigerant circuit.

8 Claims, 23 Drawing Sheets

(51) Int. Cl.
  *B60H 1/22* (2006.01)
  *B60H 1/32* (2006.01)
  *B60K 11/02* (2006.01)
  *F16K 11/085* (2006.01)
(52) U.S. Cl.
  CPC ..... *B60H 1/00885* (2013.01); *B60H 1/00921* (2013.01); *B60H 1/143* (2013.01); *B60H 1/22* (2013.01); *B60H 1/2221* (2013.01); *B60H 1/32281* (2019.05); *B60K 11/02* (2013.01); *F16K 11/0853* (2013.01); *B60H 2001/00307* (2013.01); *B60H 2001/00928* (2013.01)
(58) Field of Classification Search
  CPC ........ B60H 1/143; B60H 1/22; B60H 1/2221; B60H 1/32281; B60H 2001/00307; B60H 2001/00928; B60K 11/02; F16K 11/0853; H01M 10/625; H01M 10/613; H01M 10/615; H01M 10/655; H01M 10/6556; H01M 10/6568; H01M 10/663
  See application file for complete search history.

(56) References Cited

U.S. PATENT DOCUMENTS

| | | | | |
|---|---|---|---|---|
| 9,561,704 | B2 * | 2/2017 | Enomoto | B60K 11/02 |
| 9,649,909 | B2 * | 5/2017 | Enomoto | B60W 10/30 |
| 9,650,940 | B2 * | 5/2017 | Kakehashi | B60H 1/00885 |
| 9,764,620 | B2 * | 9/2017 | Liu | B60H 1/3213 |
| 9,822,752 | B2 * | 11/2017 | Ragazzi | B60W 20/00 |
| 10,118,460 | B1 * | 11/2018 | Blatchley | H01M 10/443 |
| 10,183,548 | B2 * | 1/2019 | Enomoto | B60H 1/00485 |
| 10,336,158 | B2 * | 7/2019 | Ragazzi | B60H 1/034 |
| 10,391,834 | B2 * | 8/2019 | Enomoto | F25B 25/005 |
| 10,562,371 | B2 * | 2/2020 | Sugimura | B60H 1/2218 |
| 11,015,516 | B2 * | 5/2021 | Guenter | F01P 7/14 |
| 11,065,934 | B2 * | 7/2021 | Lee | B60H 1/00328 |
| 11,072,251 | B2 * | 7/2021 | Dudar | H01M 10/486 |
| 11,207,941 | B2 * | 12/2021 | Lee | B60H 1/00385 |
| 11,230,384 | B2 * | 1/2022 | Lynn | B60L 3/0046 |
| 11,318,860 | B2 * | 5/2022 | Yuan | H01M 10/663 |
| 11,370,325 | B2 * | 6/2022 | Durrani | B60L 58/26 |
| 11,456,497 | B2 * | 9/2022 | Mackenzie | H01M 10/625 |
| 11,479,077 | B2 * | 10/2022 | Kim | B60H 1/32284 |
| 11,662,127 | B2 * | 5/2023 | Deivasigamani | F25B 49/02 62/160 |
| 11,664,545 | B2 * | 5/2023 | Agathocleous | H01M 10/66 429/72 |
| 11,724,570 | B2 * | 8/2023 | Miyoshi | B60H 1/3227 165/202 |
| 11,780,297 | B2 * | 10/2023 | Lee | B60H 1/32284 62/160 |
| 11,807,066 | B2 * | 11/2023 | Hwang | B60H 1/00878 |
| 11,959,668 | B2 * | 4/2024 | Lee | B60H 1/143 |
| 12,061,031 | B2 * | 8/2024 | Lee | B60H 1/00392 |
| 12,344,075 | B2 * | 7/2025 | Makihara | H01M 10/615 |
| 2001/0043808 | A1 * | 11/2001 | Matsunaga | B60H 1/2221 219/202 |
| 2009/0078400 | A1 * | 3/2009 | Tamura | B60H 1/00499 165/287 |
| 2010/0005822 | A1 * | 1/2010 | Bering | B60H 1/3222 62/239 |
| 2010/0293966 | A1 * | 11/2010 | Yokomachi | B60H 1/00478 62/271 |
| 2011/0214838 | A1 * | 9/2011 | Akiyama | B60H 1/00492 165/41 |
| 2012/0247137 | A1 * | 10/2012 | Nakajo | B60H 1/00807 62/160 |
| 2012/0279243 | A1 * | 11/2012 | Endo | B60H 1/039 62/238.6 |
| 2019/0381857 | A1 * | 12/2019 | Lee | H01M 10/613 |
| 2020/0009968 | A1 * | 1/2020 | Lewis | H01M 10/6568 |
| 2020/0031194 | A1 * | 1/2020 | Lee | B60H 1/00392 |
| 2020/0361280 | A1 * | 11/2020 | Hashimoto | B60H 1/00885 |
| 2021/0245571 | A1 * | 8/2021 | Hwang | B60H 1/00278 |
| 2022/0055454 | A1 * | 2/2022 | Lee | B60H 1/32284 |
| 2022/0097487 | A1 * | 3/2022 | Jin | H01M 10/6568 |
| 2022/0349627 | A1 * | 11/2022 | Lee | F25B 5/04 |
| 2022/0396117 | A1 * | 12/2022 | Kim | B60H 1/323 |
| 2023/0033226 | A1 * | 2/2023 | Healy | B60H 1/20 |
| 2023/0256793 | A1 * | 8/2023 | Hoshino | H01M 10/613 165/202 |
| 2024/0270045 | A1 * | 8/2024 | Koyama | B60H 1/2221 |
| 2024/0286527 | A1 * | 8/2024 | Suzuki | B60L 58/27 |
| 2024/0336114 | A1 * | 10/2024 | Zhao | B60H 1/32284 |
| 2025/0088003 | A1 * | 3/2025 | Deivasigamani | F24D 17/0031 |

FOREIGN PATENT DOCUMENTS

| | | | | |
|---|---|---|---|---|
| CN | 108699943 | B * | 7/2021 | ............ B60H 1/08 |
| DE | 102022200971 | A1 * | 8/2023 | ............ B60K 11/02 |
| JP | 2014-201224 | A | 10/2014 | |
| JP | 2014-218211 | A | 11/2014 | |

* cited by examiner

[LOW TEMPERATURE COMMUNICATION STATE]
(COOLING, BATTERY COOLING)

FIG. 14  [HIGH TEMPERATURE COMMUNICATION STATE]
(AIR CONDITIONING STOP, BATTERY ACTIVE HEATING)
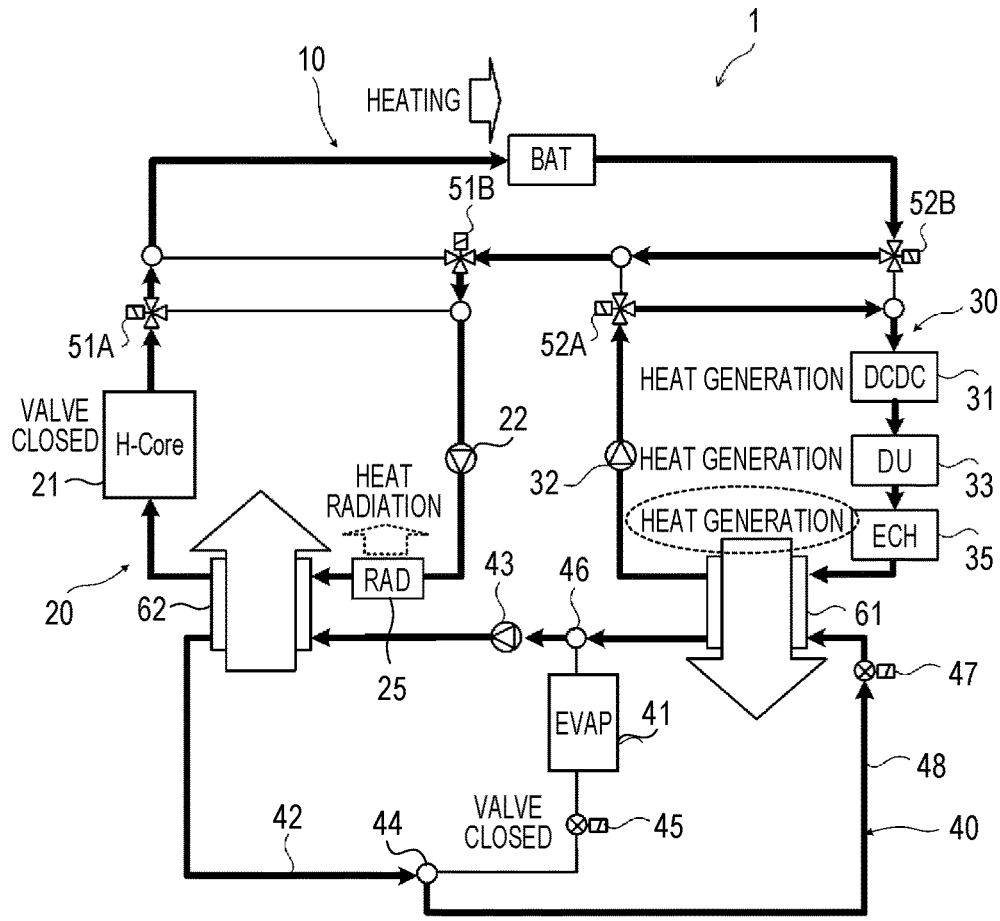
FIG. 15
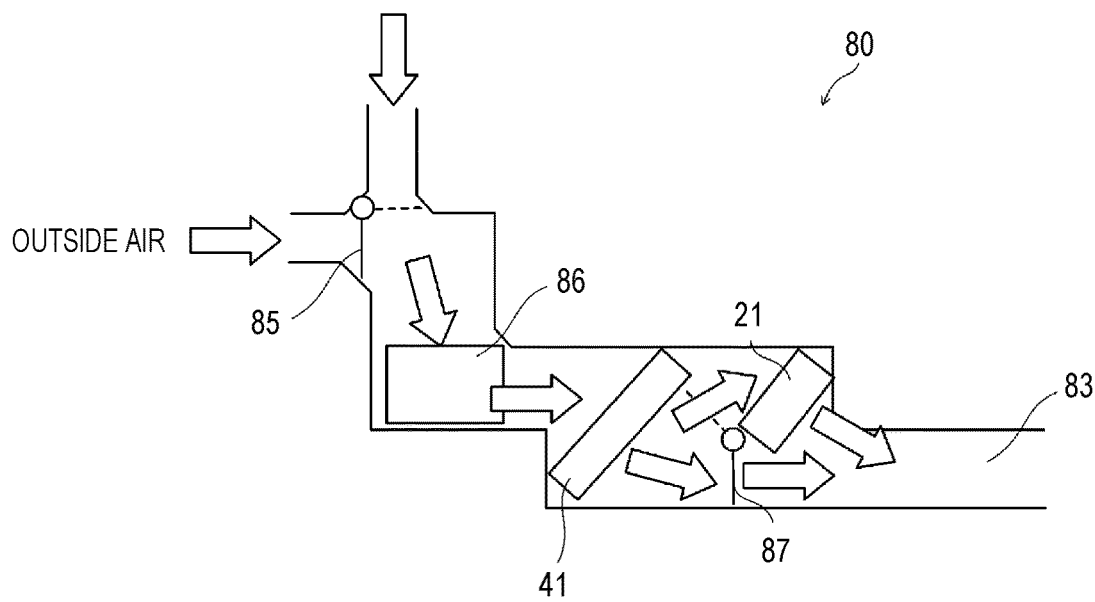

FIG. 17
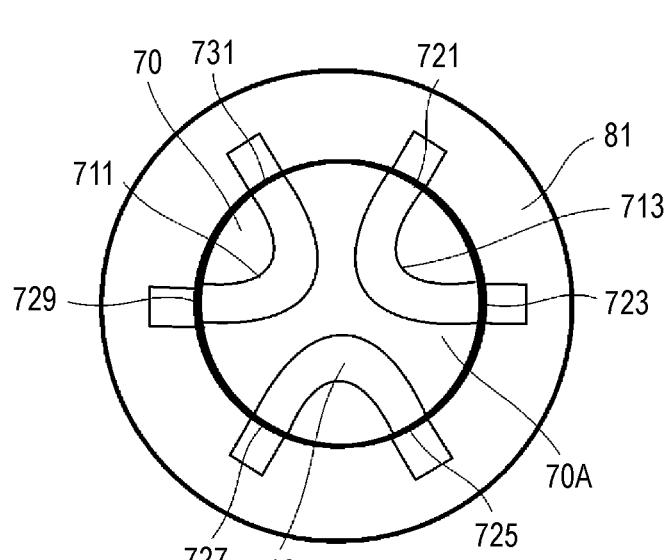
A-A CROSS SECTION
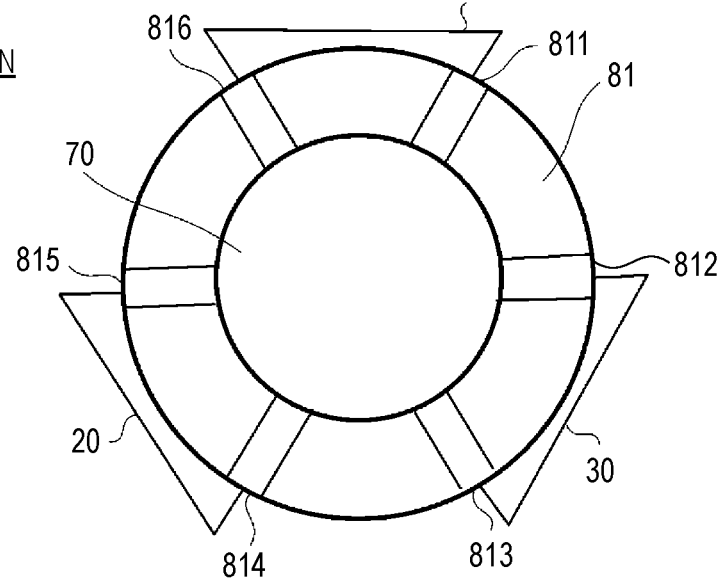
B-B CROSS SECTION
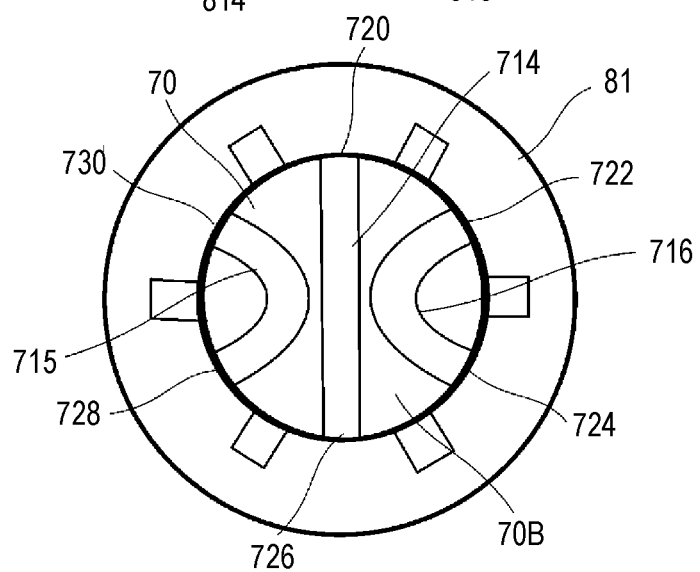
C-C CROSS SECTION

FIG. 19
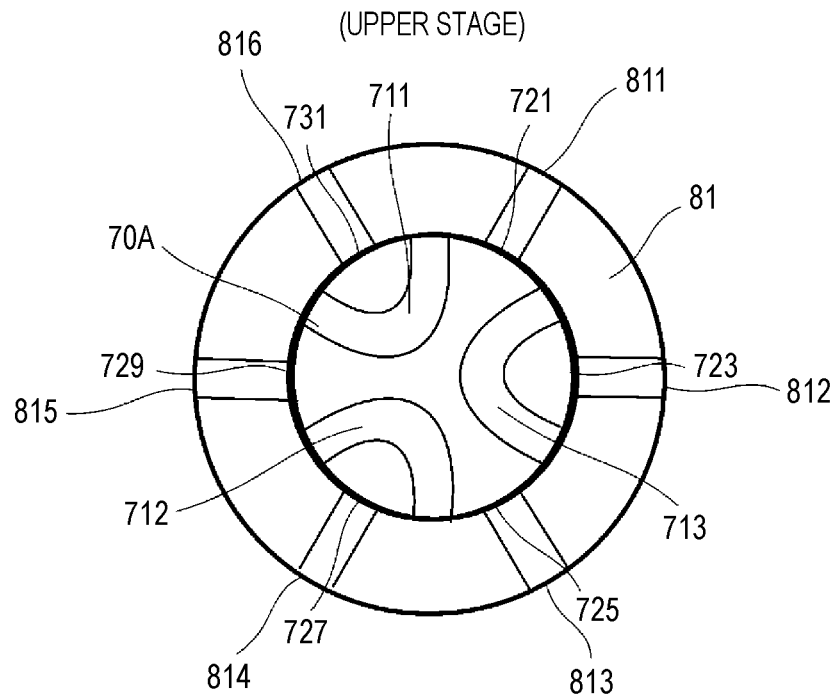
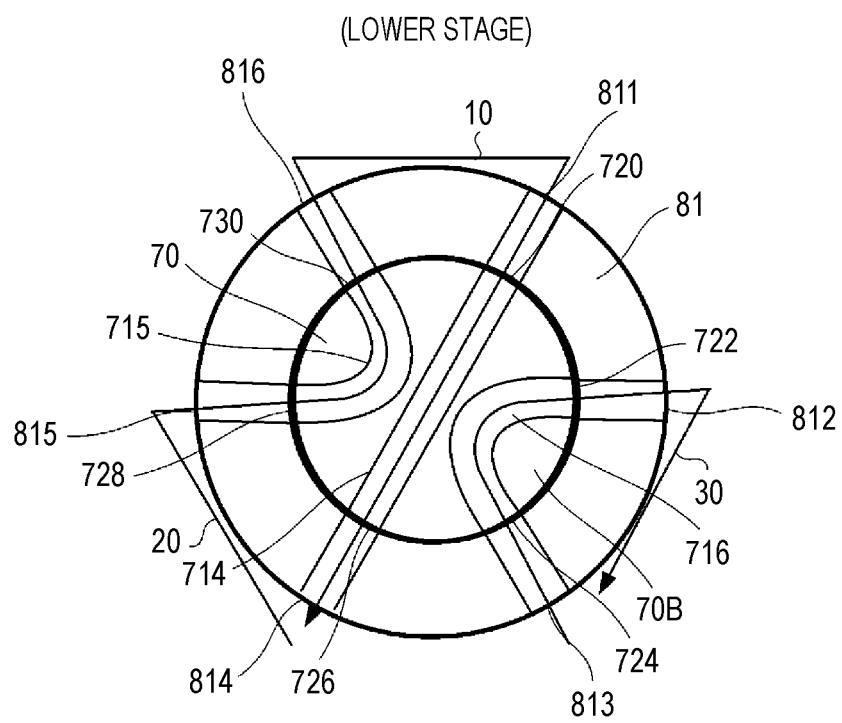

FIG. 23
[INTEGRATION VALVE: SIXTH STATE, TEMPERATURE CONTROL SYSTEM: LOW TEMPERATURE COMMUNICATION STATE]
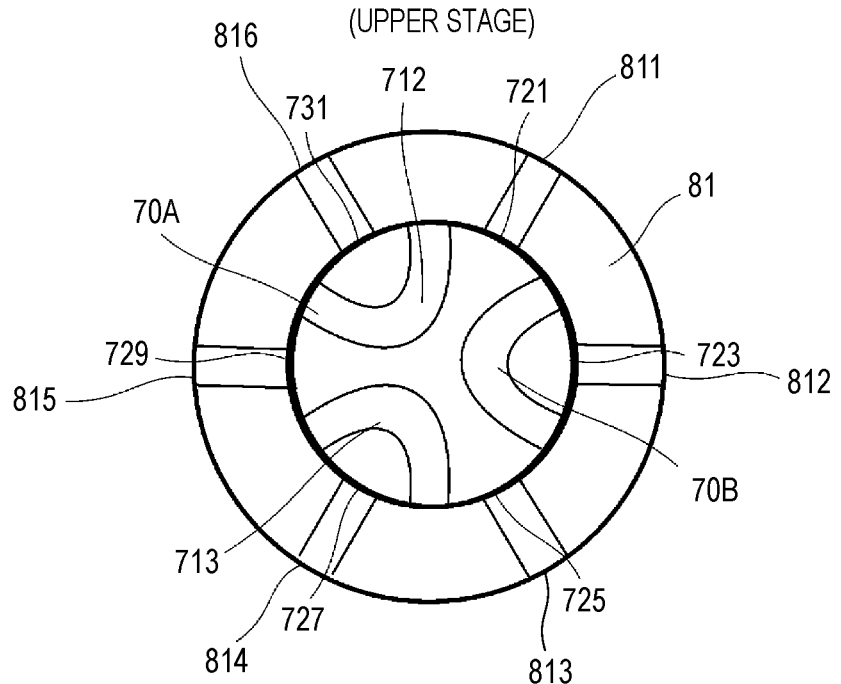
(UPPER STAGE)
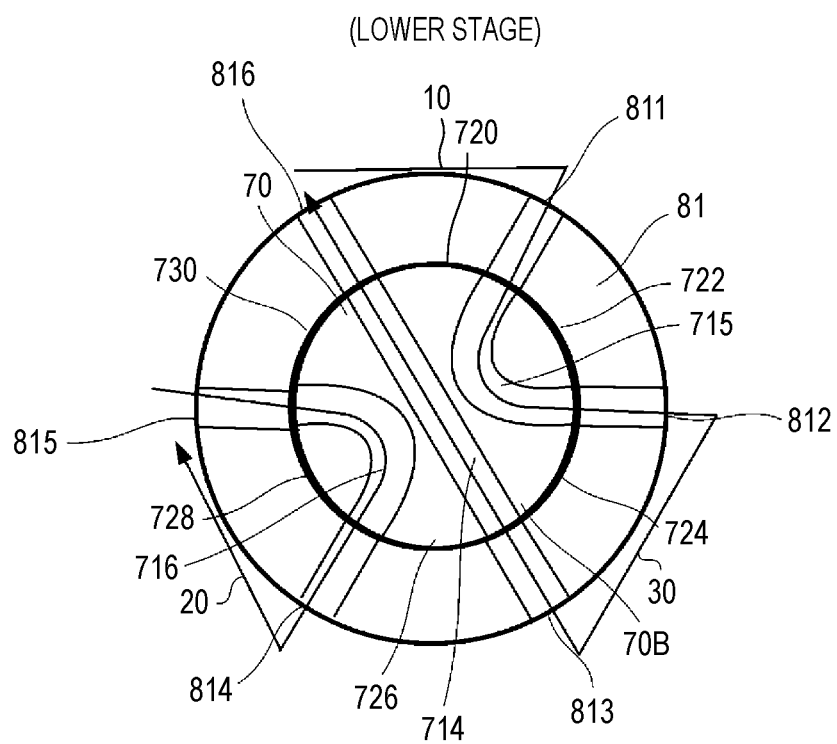
(LOWER STAGE)

FIG. 24

| | FIRST STATE | SECOND STATE | THIRD STATE | FOURTH STATE | FIFTH STATE | SIXTH STATE |
|---|---|---|---|---|---|---|
| VALVE UPPER STAGE | FULL COMMUNICATION STATE | ALL CLOSED | NON-COMMUNICATION STATE | ALL CLOSED | NON-COMMUNICATION STATE | ALL CLOSED |
| VALVE LOWER STAGE | ALL CLOSED | HIGH TEMPERATURE COMMUNICATION STATE | ALL CLOSED | HIGH TEMPERATURE AND LOW TEMPERATURE | ALL CLOSED | LOW TEMPERATURE COMMUNICATION STATE |
| MODE | BATTERY PASSIVE HEATING MODE BATTERY PASSIVE COOLING MODE | BATTERY HEATING MODE | BATTERY NON-ADJUSTMENT MODE | — | BATTERY PASSIVE HEATING MODE BATTERY PASSIVE COOLING MODE | BATTERY COOLING MODE |

TEMPERATURE CONTROL SYSTEM

CROSS-REFERENCE TO RELATED APPLICATIONS

This application is based on and claims priority under 35 USC 119 from Japanese Patent Application No. 2023-021802 filed on Feb. 15, 2023, the entire content of which is incorporated herein by reference.

TECHNICAL FIELD

The present disclosure relates to a temperature control system for a battery mounted on a vehicle.

BACKGROUND ART

In recent years, researches and developments have been conducted that contribute to an increase in energy efficiency in order to allow more people to access affordable, reliable, sustainable, and advanced energy.

Regarding a temperature control system for a battery mounted on a vehicle, there is known a technique for controlling a temperature of the battery by using a refrigeration cycle circuit of an air conditioner for the vehicle (See JP2014-218211A and JP2014-201224A).

In the present technique, since it is impossible to use heat absorption of cooling water that cools a heat generating component when the battery is heated, it is required to improve energy efficiency. In particular, in a solid-state battery having a high temperature range on a high temperature side, there is a possibility that the battery can be heated in a mode different from that of a liquid battery.

SUMMARY OF INVENTION

The present disclosure provides a temperature control system having high energy efficiency of heating a battery made of a solid-state battery having a high temperature range.

An aspect of the present disclosure relates to a temperature control system for a battery mounted on a vehicle, the temperature control system including:
- a battery temperature control circuit configured to allow a refrigerant to flow therethrough and adjust a temperature of the battery;
- a high temperature refrigerant circuit configured to radiate heat from the refrigerant to heat the vehicle;
- a low temperature refrigerant circuit configured to absorb heat from a heat generating component different from the battery into the refrigerant;
- a refrigeration cycle circuit used for an air conditioner of the vehicle;
- a first valve mechanism configured to switch between a high temperature side connection state in which the battery temperature control circuit and the high temperature refrigerant circuit communicate with each other and a high temperature side disconnection state in which the battery temperature control circuit and the high temperature refrigerant circuit are disconnected;
- a second valve mechanism configured to switch between a low temperature side connection state in which the battery temperature control circuit and the low temperature refrigerant circuit communicate with each other and a low temperature side disconnection state in which the battery temperature control circuit and the low temperature refrigerant circuit are disconnected;
- a first heat exchanger configured to transfer heat from the low temperature refrigerant circuit to the refrigeration cycle circuit; and
- a second heat exchanger configured to transfer heat from the refrigeration cycle circuit to the high temperature refrigerant circuit, in which the battery is a solid-state battery, the first valve mechanism and the second valve mechanism are switchable to a high temperature communication state in which the battery temperature control circuit and the high temperature refrigerant circuit communicate with each other and the low temperature refrigerant circuit is disconnected from the battery temperature control circuit and the high temperature refrigerant circuit which communicate with each other, by setting the low temperature side disconnection state and the high temperature side connection state, and in the high temperature communication state, the refrigerant flowing through the battery passes through the second heat exchanger, and the refrigerant flowing through the heat generating component passes through the first heat exchanger.

According to the present disclosure, it is possible to improve the energy efficiency of heating a battery made of a solid-state battery having a high temperature range.

BRIEF DESCRIPTION OF DRAWINGS

Exemplary embodiment(s) of the present invention will be described in detail based on the following figures, wherein:

FIG. 14 is a circuit diagram of the temperature control system 1 showing a battery active heating mode when the air conditioning is stopped in the high temperature communication state;

FIG. 15 is a schematic diagram of an automatic air conditioner system 80;

FIG. 17 is a diagram showing an A-A cross section, a B-B cross section, and a C-C cross section of FIG. 16;

FIG. 19 is a diagram showing a second state of the integration valve 60 in which the temperature control system 1 is in the high temperature communication state;

FIG. 23 is a diagram showing a sixth state of the integration valve 60 in which the temperature control system 1 is in the low temperature communication state; and FIG. 24 is a table summarizing the states of the integration valve 60 and the modes.

DESCRIPTION OF EMBODIMENTS

Hereinafter, an embodiment of a temperature control system for a vehicle according to the present disclosure will be described with reference to the accompanying drawings.

Figure 1:
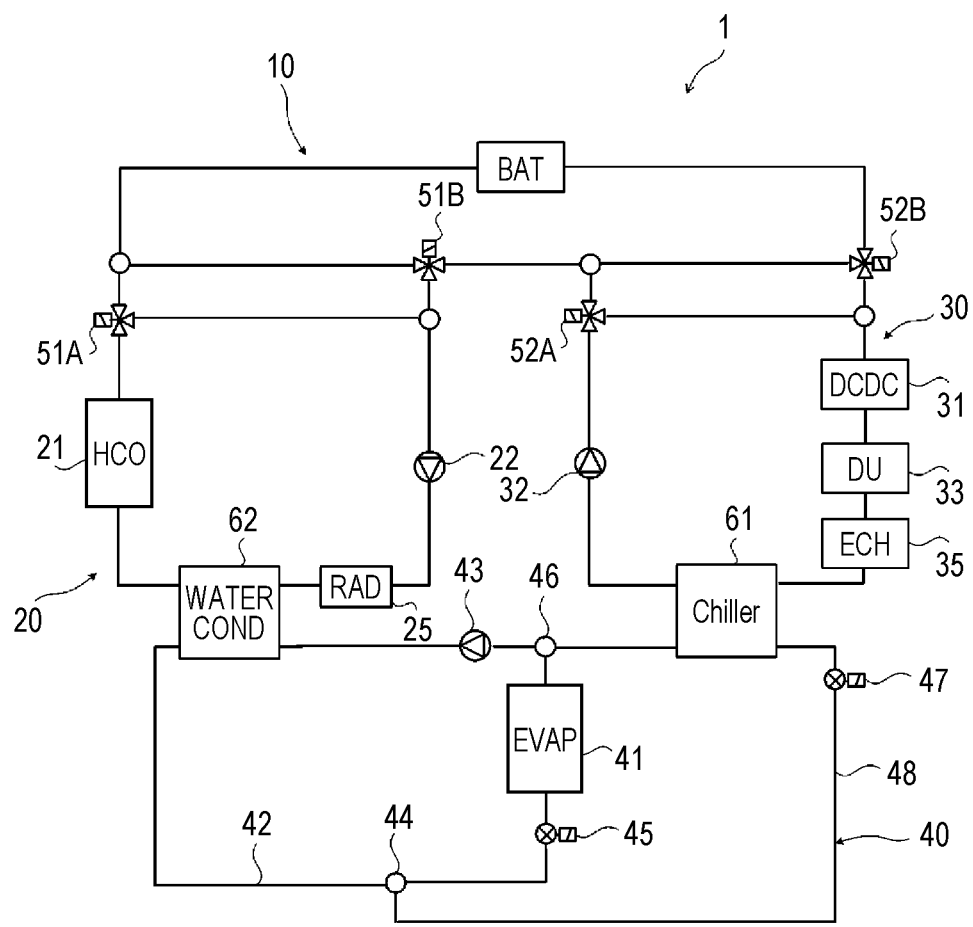
FIG. 1 is a circuit diagram of a temperature control system 1 according to an embodiment of the present disclosure.

A configuration of a temperature control system 1 according to the present embodiment will be described. FIG. 1 is a circuit diagram of the temperature control system 1.

As shown in FIG. 1, the temperature control system 1 includes a battery water circuit 10, a high temperature water circuit 20, a low temperature water circuit 30, a refrigeration cycle circuit 40 used for an air conditioner of a vehicle, first three-way valves 51A and 51B, second three-way valves 52A and 52B, a chiller 61, and a water condenser 62.

A battery BAT is disposed in the battery water circuit 10. The battery water circuit 10 controls a temperature of the BAT such that the temperature of the battery BAT falls within a predetermined range. That is, the battery water circuit 10 cools the battery BAT when the temperature of the battery BAT is higher than the predetermined range, and heats the battery BAT when the temperature of the battery BAT is lower than the predetermined range.

The battery BAT is a solid-state battery. The battery BAT may be an all-solid-state battery. The solid-state battery has a wider operating temperature range than a liquid battery, and in particular, has a wider upper limit temperature range than the liquid battery. Therefore, it is possible to cause the battery water circuit 10, the high temperature water circuit 20, and the low temperature water circuit 30 to communicate with each other, which had to be independent in the liquid battery.

A heater core 21, an electric pump 22, a water radiator 25, and the water condenser 62 are arranged in the high temperature water circuit 20. The heater core 21 is incorporated in an automatic air conditioner system 80 of the air conditioner shown in FIG. 15.

The automatic air conditioner system 80 uses a fan 86 to selectively take in air in a vehicle compartment (inside air) and air outside the vehicle compartment (outside air) through an inside/outside air switching valve 85, and supplies the air to a temperature control valve 87 via an evaporator 41. A flow path connected to an air blow-out flow path 83 directly connected to an air blow-out port of the vehicle compartment, and a flow path connected to the heater core 21 are provided downstream of the temperature control valve 87. In the automatic air conditioner system 80, the temperature control valve 87 is controlled to close when the air conditioner is turned off (when air conditioning is stopped, see FIGS. 2, 3, 7, and 14), and during cooling (when cooling is operated, see FIGS. 4, 8, and 11), and the flow path connected to the heater core 21 is disconnected.

On the other hand, during heating (when heating is operated, see FIGS. 6, 10, and 13) and dehumidification (when dehumidification is operated, see FIGS. 5, 9, and 12) of the air conditioner, an opening degree of the temperature control valve 87 is controlled according to a set temperature, and an amount of air supplied to each of the flow paths is adjusted. A refrigerant in the high temperature water circuit 20 flows through the heater core 21, and air passing through the heater core 21 is radiated with heat by the refrigerant, thereby warming the air. That is, the high temperature water circuit 20 radiates the heat from the refrigerant to heat the vehicle.

The water radiator 25 is provided in the high temperature water circuit 20 alone, and in the temperature control system 1, the heat radiation to the outside air from the refrigerant is performed by the water radiator 25. Accordingly, the heat radiation to the outside air can be collected in the water radiator 25 of the high temperature water circuit 20, and an air-cooled condenser of the refrigeration cycle circuit can be eliminated.

The water condenser 62 is a heat exchanger that transfers heat from the refrigeration cycle circuit 40 to the high temperature water circuit 20. The water condenser 62 is provided downstream of a compressor 43 and upstream of expansion valves 45 and 47 in the refrigeration cycle circuit 40 to be described later, and transfers heat of a refrigerant having a high temperature in the compressor 43 to the refrigerant in the high temperature water circuit 20.

An electric pump 32, an in-vehicle charger 31, a drive device 33, a water heater 35, and the chiller 61 are arranged in the low temperature water circuit 30. The in-vehicle charger 31 is an example of a heat generating component, and other heat generating components that need to be cooled, such as a DC-DC converter, may be disposed in the low temperature water circuit 30 instead of or together with the in-vehicle charger 31. The drive device 33 is a drive system device such as a drive motor, a power generation motor, an inverter, or a transmission of the vehicle.

A refrigerant temperature of the high temperature water circuit 20 connected to the heater core 21 is higher than a refrigerant temperature of the low temperature water circuit 30 connected to the drive device 33, and in the temperature control system 1, the high temperature water circuit 20 is a circuit that radiates heat from a refrigerant, and the low temperature water circuit 30 is a circuit that absorbs heat into a refrigerant.

The water heater 35 is provided in the low temperature water circuit 30 alone. By intentionally disposing the water heater 35 in the low temperature water circuit 30, it is possible to ensure a water temperature for heating through the refrigeration cycle circuit 40 simply by increasing a temperature of a refrigerant slightly with a minimum output when heating in an extremely low temperature environment or increasing a temperature of the battery.

The chiller 61 is a heat exchanger that transfers heat from the low temperature water circuit 30 to the refrigeration cycle circuit 40. The chiller 61 is provided downstream of the expansion valve 47 and upstream of the compressor 43 in the refrigeration cycle circuit 40 to be described later, cools a refrigerant in the low temperature water circuit 30 via a refrigerant having a low temperature in the expansion valve 47, and transfers heat received from the low temperature water circuit 30 to the refrigerant in the high temperature water circuit 20 via the water condenser 62.

The refrigeration cycle circuit 40 includes a main flow path 42 in which the evaporator 41, the compressor 43, the water condenser 62, and the expansion valve 45 are arranged in this order, and a branching flow path 48 that branches from the main flow path 42 at a branching portion 44 between the water condenser 62 and the expansion valve 45 and merges with the main flow path 42 at a merging portion 46 between the evaporator 41 and the compressor 43. The expansion valve 47 and the chiller 61 are arranged in this order from the branching portion 44 in the branching flow path 48.

The compressor 43 is in an off state (non-operating state) when the air conditioner is turned off (when the air conditioning is stopped, see FIGS. 2 and 3), and is in an on state (operating state) during heating (when the heating is operated, see FIGS. 6, 10, and 13), cooling (when the cooling is operated, see FIGS. 4, 8, and 11), and dehumidification (when the dehumidification is operated, see FIGS. 5, 9, and 12) of the air conditioner. However, even when the air conditioner is turned off, when heat exchange is performed by the chiller 61, the compressor 43 is in the on state (operating state) (see FIGS. 7 and 14).

The expansion valve 45 is in an off state when the air conditioner is turned off (when the air conditioning is stopped, see FIGS. 2, 3, 7, and 14) and during heating (when the heating is operated, see FIGS. 6, 10, and 13), and is in an on state during cooling (when the cooling is operated, see FIGS. 4, 8, and 11) and dehumidification (when the dehumidification is operated, see FIGS. 5, 9, and 12) of the air conditioner. The expansion valve 47 is in an on state when the heat exchange is performed by the chiller 61 (see FIGS. 4 to 14), and is in an off state when the heat exchange is not performed by the chiller 61 (see FIGS. 2 and 3).

A common refrigerant flows through the battery water circuit 10, the high temperature water circuit 20, and the low temperature water circuit 30 configured in this way, the battery water circuit 10 and the high temperature water circuit 20 are configured to perform communication/disconnection by the first three-way valves 51A and 51B, and the battery water circuit 10 and the low temperature water circuit 30 are configured to perform communication/disconnection by the second three-way valves 52A and 52B. The refrigerant is a liquid medium containing liquid such as water and oil as a main component.

The first three-way valves 51A and 51B switch between a high temperature side connection state in which the battery water circuit 10 and the high temperature water circuit 20 communicate with each other and a high temperature side disconnection state in which the battery water circuit 10 and the high temperature water circuit 20 are disconnected. The second three-way valves 52A and 52B switch between a low temperature side connection state in which the battery water circuit 10 and the low temperature water circuit 30 communicate with each other and a low temperature side disconnection state in which the battery water circuit 10 and the low temperature water circuit 30 are disconnected.

Therefore, the first three-way valves 51A and 51B and the second three-way valves 52A and 52B are configured to switch the temperature control system 1 to the following full communication state, high temperature communication state, low temperature communication state, and non-communication state.

Figure 2:
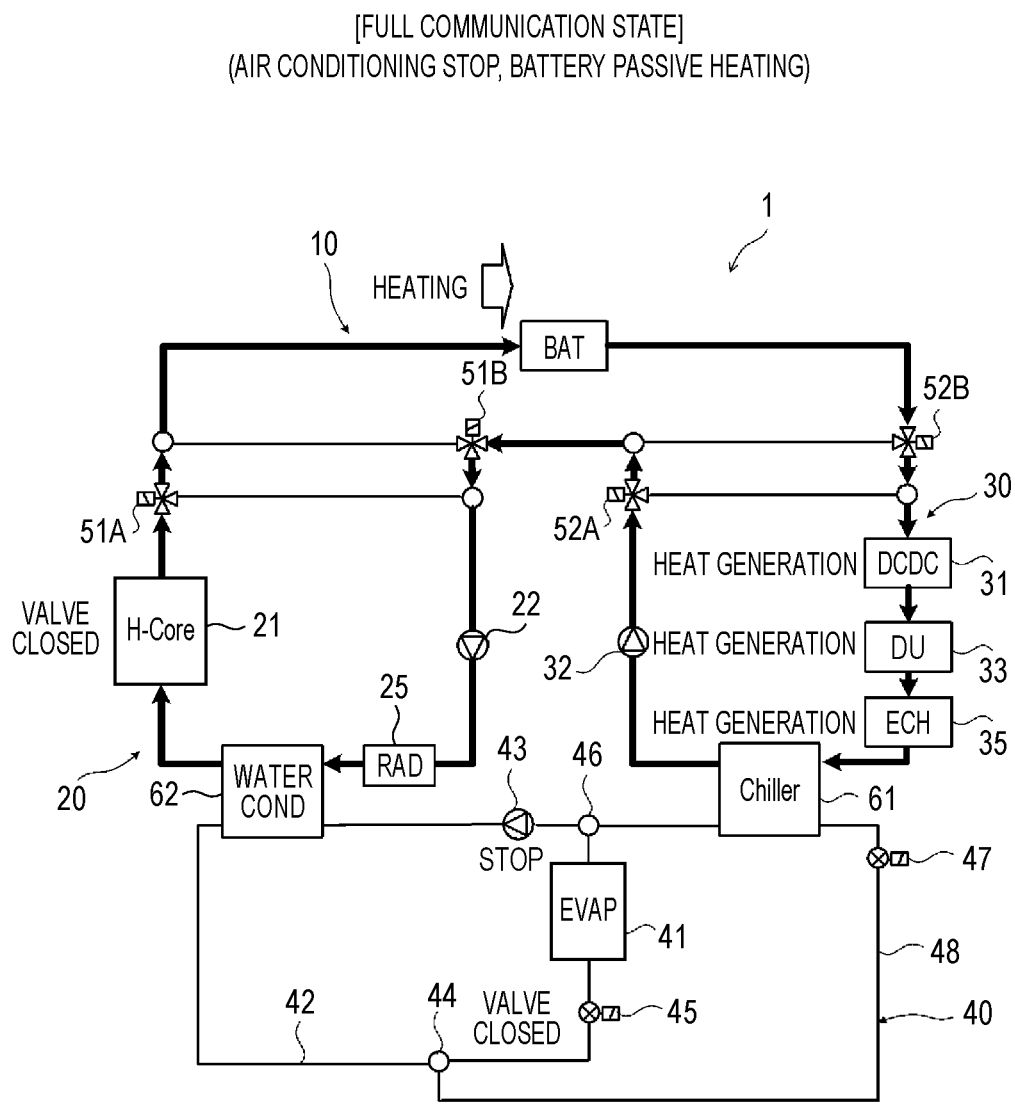
FIG. 2 is a circuit diagram of the temperature control system 1 showing a battery passive heating mode when air conditioning is stopped in a full communication state.
Figure 3:
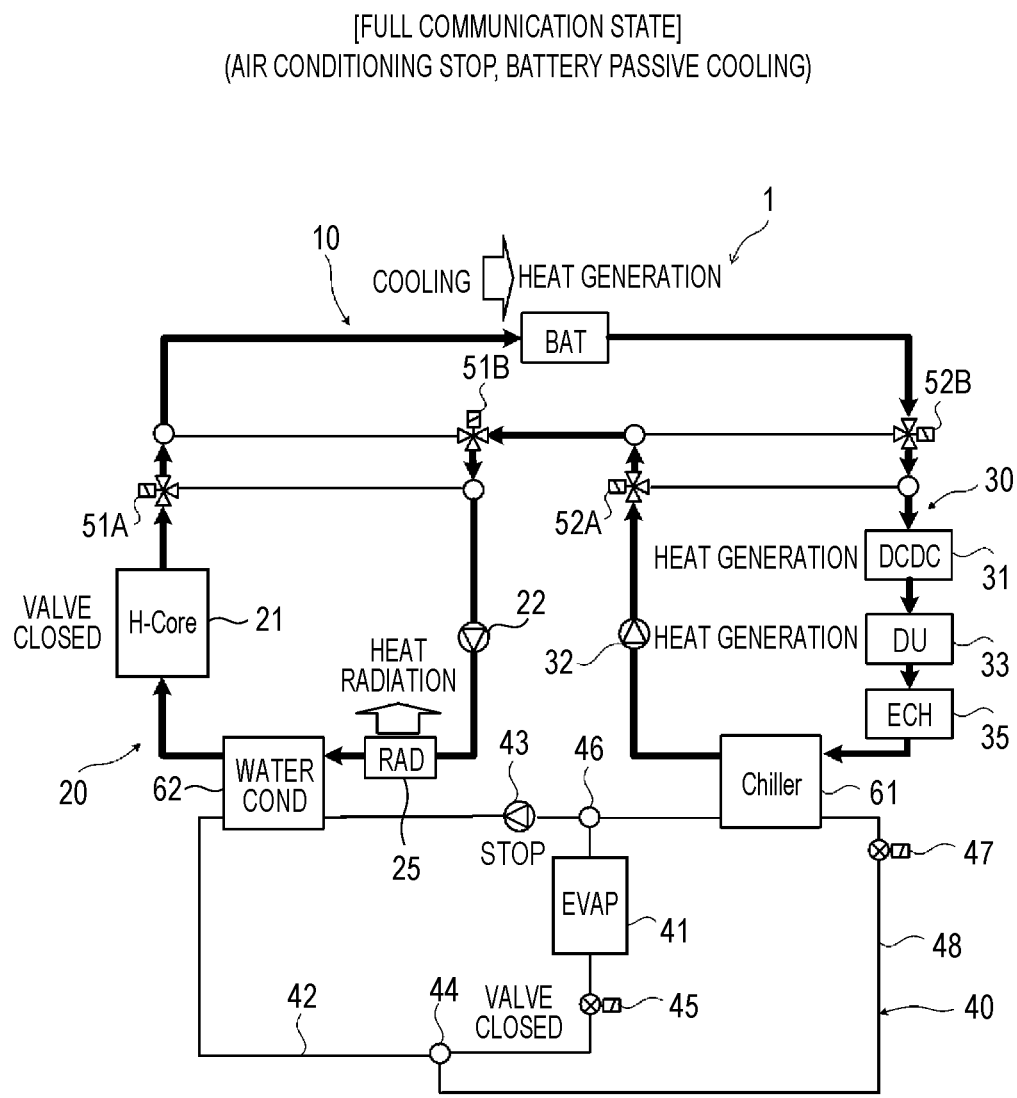
FIG. 3 is a circuit diagram of the temperature control system 1 showing a battery passive cooling mode when the air conditioning is stopped in the full communication state.

The full communication state is a state in which all of the battery water circuit 10, the high temperature water circuit 20, and the low temperature water circuit 30 communicate with each other, which is achieved by bringing the second three-way valves 52A and 52B into the low temperature side connection state and bringing the first three-way valves 51A and 51B into the high temperature side connection state, as shown in FIGS. 2 and 3. In the full communication state, by driving the electric pump 32, the refrigerant circulates to return to the electric pump 32 via the second three-way valve 52A, the first three-way valve 51B, the electric pump 22, the water radiator 25, the water condenser 62, the heater core 21, the first three-way valve 51A, the battery BAT, the second three-way valve 52B, the in-vehicle charger 31, the drive device 33, the water heater 35, and the chiller 61. The electric pump 22 may be driven instead of the electric pump 32, or both may be driven.

In the full communication state (air conditioning stopped) shown in FIG. 2, when a battery temperature is lower than the predetermined range, the water heater 35 is turned on, and the electric pump 22 (and/or the electric pump 32) is driven to circulate the refrigerant through the battery water circuit 10, the high temperature water circuit 20, and the low temperature water circuit 30. Then, the refrigerant is warmed by heat of the in-vehicle charger 31, the drive device 33, and the water heater 35, and the battery BAT is heated (battery passive heating). The water radiator 25 is controlled such that the heat is not radiated by a shutter grill or the like.

In the full communication state (air conditioning stopped) shown in FIG. 3, when a battery temperature is higher than the predetermined range, the water heater 35 is turned off, and the electric pump 22 (and/or the electric pump 32) is driven to circulate the refrigerant through the battery water circuit 10, the high temperature water circuit 20, and the low temperature water circuit 30. Then, the refrigerant is cooled by heat radiation from the water radiator 25, and the battery BAT is cooled.

According to the temperature control system 1, the battery water circuit 10, the high temperature water circuit 20, and the low temperature water circuit 30 can communicate with each other, and thus even when the air conditioner is stopped, it is possible to control the temperature of the battery BAT by setting the full communication state as shown in FIGS. 2 and 3.

The low temperature communication state is a state in which the battery water circuit 10 and the low temperature water circuit 30 communicate with each other and the high temperature water circuit 20 is disconnected from the battery water circuit 10 and low temperature water circuit 30 which communicate with each other, by bringing the second three-way valves 52A and 52B into the low temperature side connection state and bringing the first three-way valves 51A and 51B into the high temperature side disconnection state, as shown in FIGS. 4 to 7. In the low temperature communication state, in the battery water circuit 10 and the low temperature water circuit 30, by driving the electric pump 32, the refrigerant circulates to return to the electric pump 32 via the second three-way valve 52A, the first three-way valve 51B, the battery BAT, the second three-way valve 52B, the in-vehicle charger 31, the drive device 33, the water heater 35, and the chiller 61. In the high temperature water circuit 20, by driving the electric pump 22, the refrigerant circulates to return to the electric pump 22 via the water radiator 25, the water condenser 62, the heater core 21, and the first three-way valve 51A.

The low temperature communication state is selected when it is necessary to cool the battery BAT.

Figure 4:
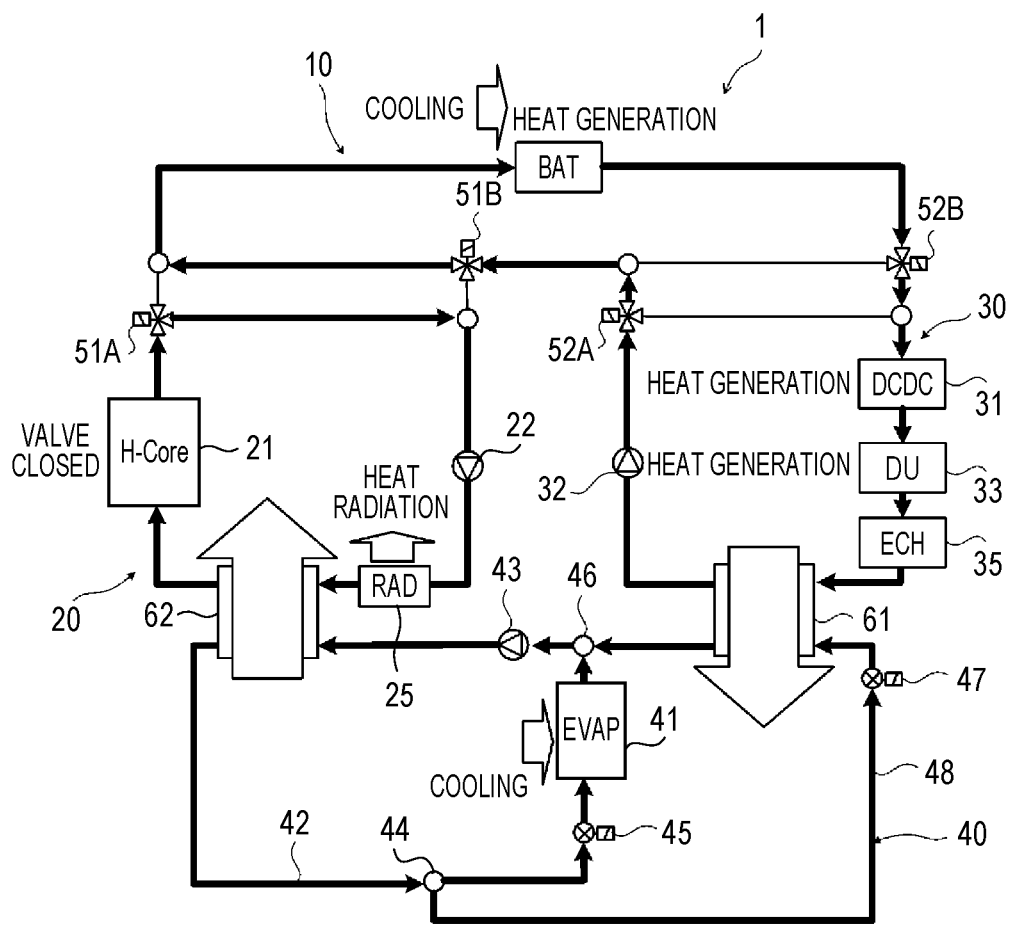
FIG. 4 is a circuit diagram of the temperature control system 1 showing a battery cooling mode during cooling when a low temperature communication state.

In the low temperature communication state (during cooling) shown in FIG. 4, when a battery temperature is higher than the predetermined range, the electric pump 32 is driven to circulate the refrigerant through the battery water circuit 10 and the low temperature water circuit 30 which communicate with each other. At this time, heat of the refrigerant is transferred to the refrigeration cycle circuit 40 by the chiller 61, the refrigerant is cooled, and the battery BAT is cooled by the refrigerant. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, and is radiated by the water radiator 25 of the high temperature water circuit 20.

Figure 5:
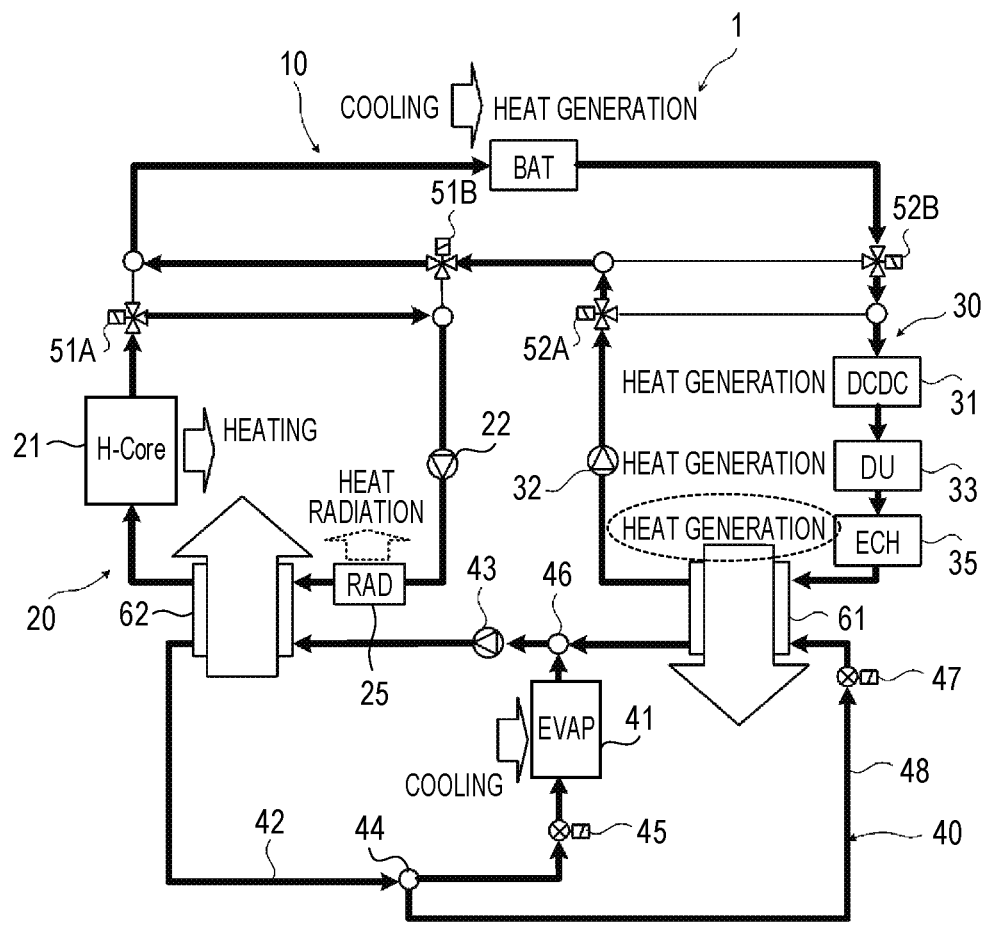
FIG. 5 is a circuit diagram of the temperature control system 1 showing a battery cooling mode during dehumidification in the low temperature communication state.

In the low temperature communication state (during dehumidification) shown in FIG. 5, when a battery temperature is higher than the predetermined range, the electric pump 32 is driven to circulate the refrigerant through the battery water circuit 10 and the low temperature water circuit 30 which communicate with each other. At this time, heat of the refrigerant is transferred to the refrigeration cycle circuit 40 by the chiller 61, the refrigerant is cooled, and the battery BAT is cooled by the refrigerant. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, is used for heating by the heater core 21, and is radiated by the water radiator 25 of the high temperature water circuit 20. In FIG. 5, heat radiation from the water radiator 25 and heat generation by the water heater 35 are drawn by dotted lines. This means that depending on an energy balance (balance of an amount of heat) of the entire temperature control system 1, either the heat generation or the heat radiation occurs. That is, if the amount of heat in the entire system is insufficient, the water heater 35 generates heat, and if the amount of heat is excessive, the heat is radiated by the water radiator 25. When the amount of heat is accidentally balanced in the entire system, neither the heat generation nor the heat radiation occurs. In order to prevent the heat from being radiated by the water radiator 25, heat exchange is restricted by a shutter grill or the like. Hereinafter, the same applies to FIGS. 6 and 9 to 13, and the description thereof will be omitted.

Figure 6:
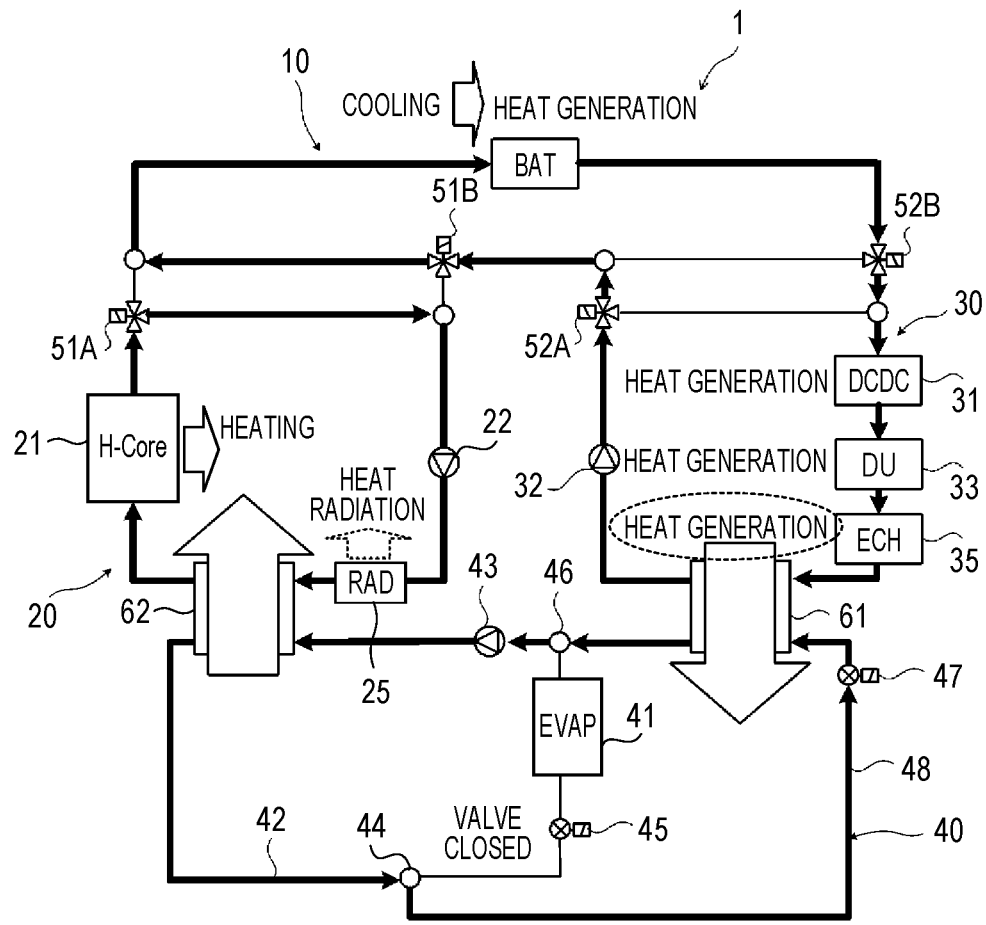
FIG. 6 is a circuit diagram of the temperature control system 1 showing a battery cooling mode during heating in the low temperature communication state.

In the low temperature communication state (during heating) shown in FIG. 6, when a battery temperature is higher than the predetermined range, the electric pump 32 is driven to circulate the refrigerant through the battery water circuit 10 and the low temperature water circuit 30 which communicate with each other. At this time, heat of the refrigerant is transferred to the refrigeration cycle circuit 40 by the chiller 61, the refrigerant is cooled, and the battery BAT is cooled by the refrigerant. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, and is used for heating by the heater core 21.

Figure 7:
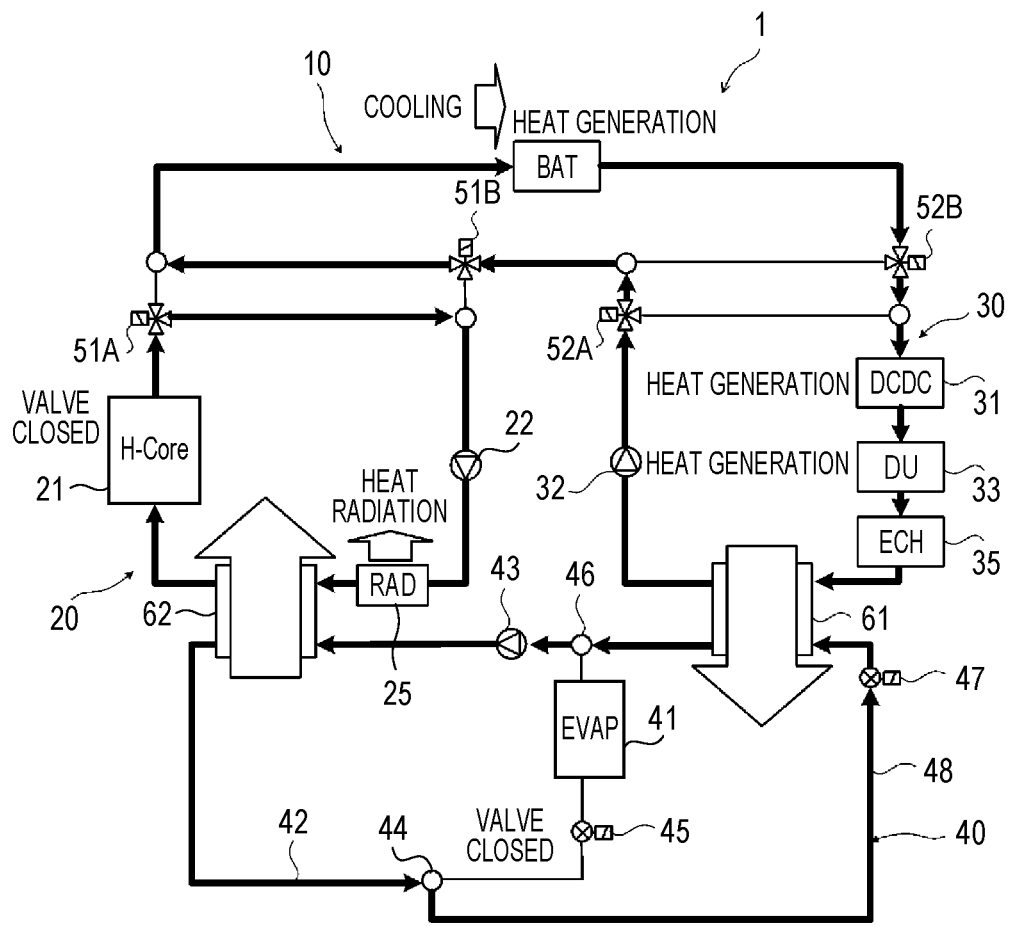
FIG. 7 is a circuit diagram of the temperature control system 1 showing a battery active cooling mode when the air conditioning is stopped in the low temperature communication state.

In the low temperature communication state (when the air conditioning is stopped) shown in FIG. 7, when a battery temperature is higher than the predetermined range, the electric pump 32 is driven to circulate the refrigerant through the battery water circuit 10 and the low temperature water circuit 30 which communicate with each other. At this time, heat of the refrigerant is transferred to the refrigeration cycle circuit 40 by the chiller 61, the refrigerant is cooled, and the battery BAT is cooled by the refrigerant. Here, when the battery temperature is higher than the predetermined range, the compressor 43 is operated and the expansion valve 47 is opened even when the air conditioning is stopped. Accordingly, the heat of the refrigerant in the low temperature water circuit 30 is transferred to the refrigeration cycle circuit 40 by the chiller 61. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, and is radiated by the water radiator 25 of the high temperature water circuit 20. In this way, even when the air conditioning is stopped, the battery BAT can be actively cooled by using the refrigeration cycle circuit 40.

Figure 8:
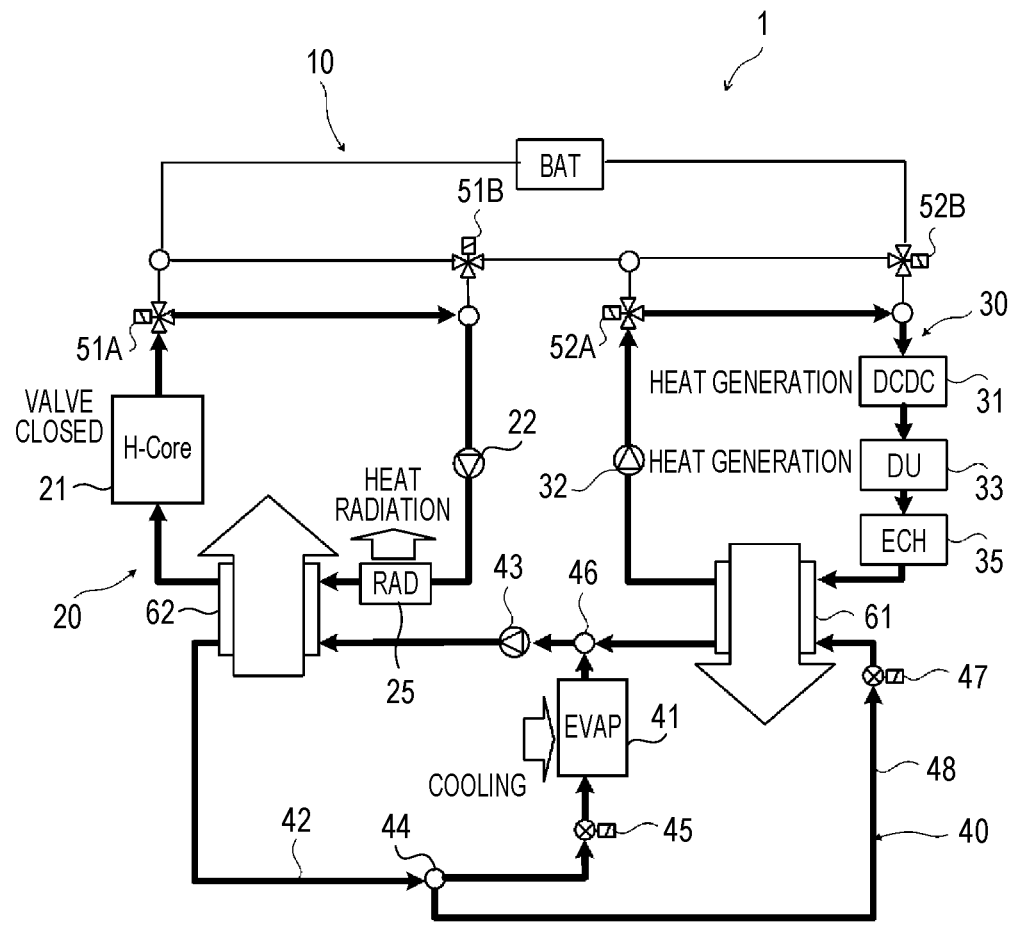
FIG. 8 is a circuit diagram of the temperature control system 1 showing a battery non-adjustment mode during cooling in a non-communication state.
Figure 9:
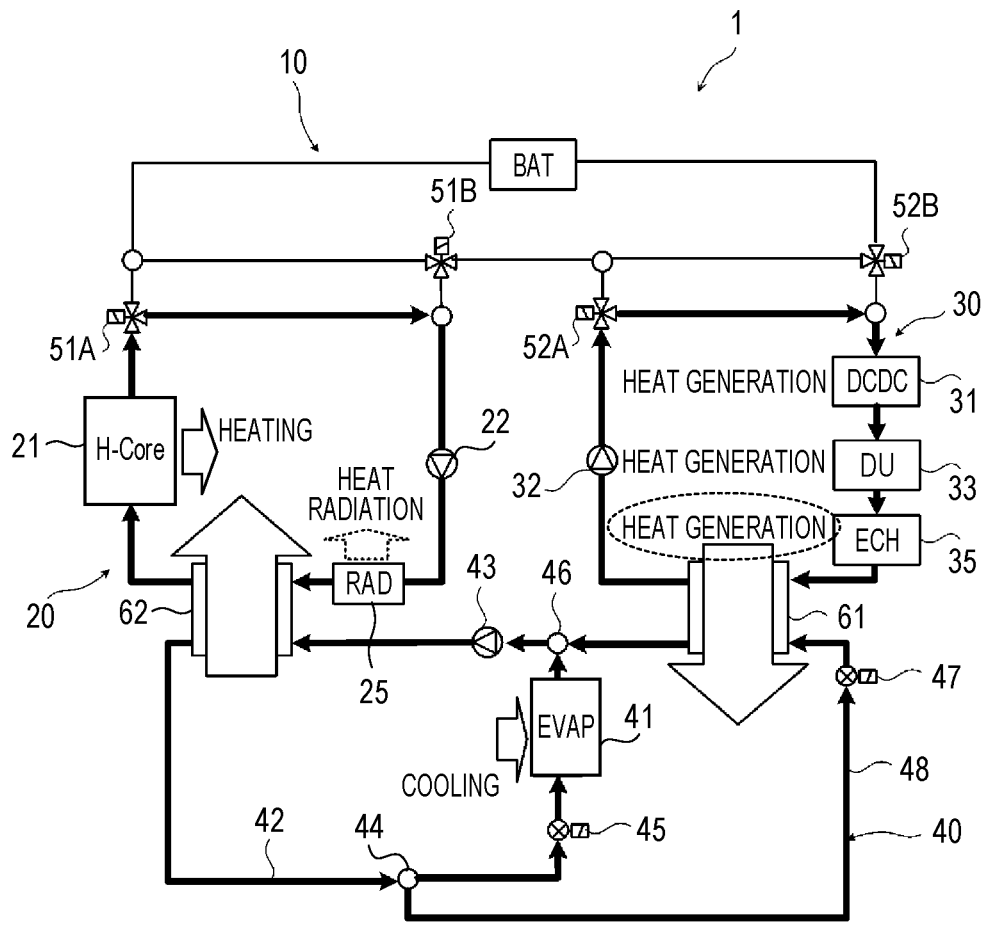
FIG. 9 is a circuit diagram of the temperature control system 1 showing a battery non-adjustment mode during dehumidification in the non-communication state.
Figure 10:
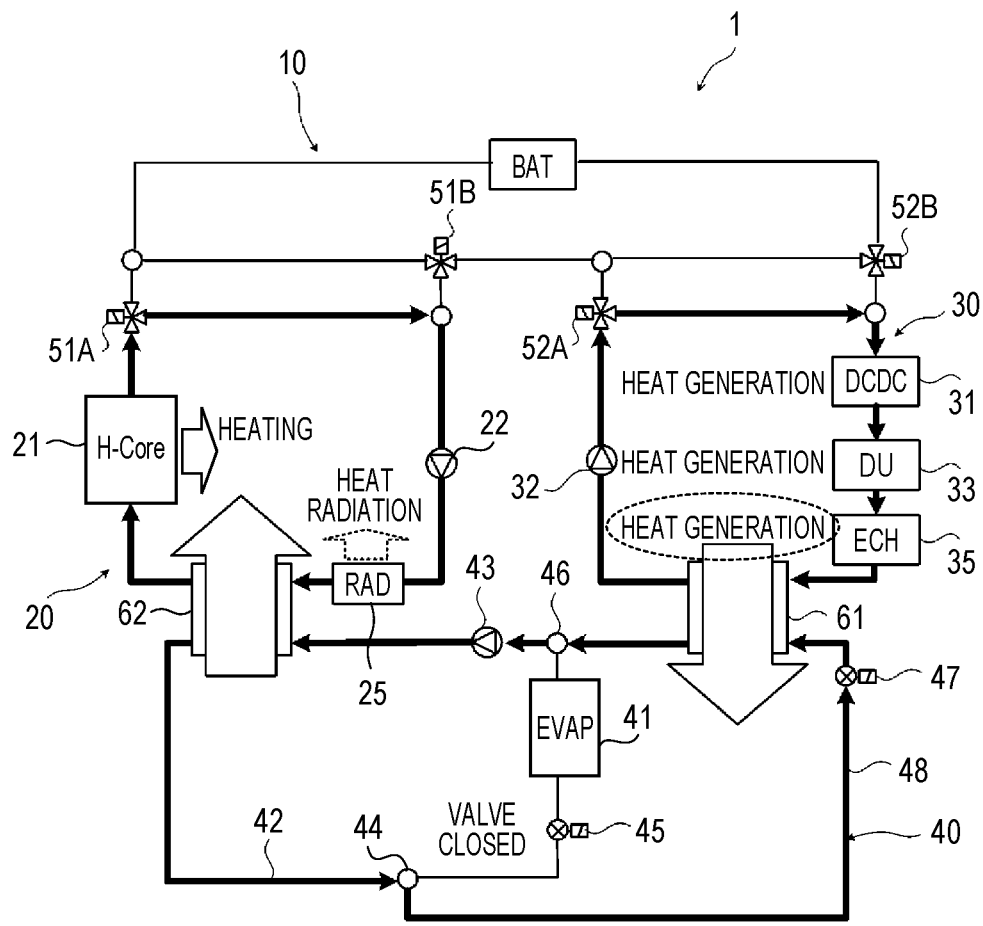
FIG. 10 is a circuit diagram of the temperature control system 1 showing a battery non-adjustment mode during heating in the non-communication state.

The non-communication state is a state in which all communication of the battery water circuit 10, high temperature water circuit 20, and low temperature water circuit 30 is disconnected by bringing the second three-way valves 52A and 52B into the low temperature side disconnection state and bringing the first three-way valves 51A and 51B into the high temperature side disconnection state as shown in FIGS. 8 to 10. In the non-communication state, the refrigerant does not circulate in the battery water circuit 10. In the high temperature water circuit 20, by driving the electric pump 22, the refrigerant circulates to return to the electric pump 22 via the water radiator 25, the water condenser 62, the heater core 21, and the first three-way valve 51A. In the low temperature water circuit 30, by driving the electric pump 32, the refrigerant circulates to return to the electric pump 32 via the second three-way valve 52A, the in-vehicle charger 31, the drive device 33, the water heater 35, and the chiller 61.

The non-communication state is selected when neither heating nor cooling of the battery BAT is required.

In the non-communication state (during cooling) shown in FIG. 8, when a battery temperature is within the predetermined range, the electric pump 32 is driven to circulate the refrigerant in the low temperature water circuit 30. At this time, heat of the refrigerant is transferred to the refrigeration cycle circuit 40 by the chiller 61, and the refrigerant is cooled. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, and is radiated by the water radiator 25 of the high temperature water circuit 20.

In the non-communication state (during dehumidification) shown in FIG. 9, when a battery temperature is within the predetermined range, the electric pump 32 is driven to circulate the refrigerant in the low temperature water circuit 30. At this time, heat of the refrigerant is transferred to the refrigeration cycle circuit 40 by the chiller 61, and the refrigerant is cooled. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, and is used for heating by the heater core 21.

In the non-communication state (during heating) shown in FIG. 10, when a battery temperature is within the predetermined range, the electric pump 32 is driven to circulate the refrigerant in the low temperature water circuit 30. At this time, heat of the refrigerant is transferred to the refrigeration cycle circuit 40 by the chiller 61, and the refrigerant is cooled. The electric pump 22 is driven to circulate the refrigerant in the high temperature water circuit 20. The heat transferred to the refrigeration cycle circuit 40 is transferred to the high temperature water circuit 20 via the water condenser 62 to warm the refrigerant, and is used for heating by the heater core 21.

The high temperature communication state is a state in which the battery water circuit 10 and the high temperature water circuit 20 communicate with each other and the low temperature water circuit 30 is disconnected from the battery water circuit 10 and the high temperature water circuit 20 which communicate with each other, by bringing the second three-way valves 52A and 52B into the low temperature side disconnection state and bringing the first three-way valves 51A and 51B into the high temperature side connection state, as shown in FIGS. 11 to 14. In the high temperature communication state, in the battery water circuit 10 and the high temperature water circuit 20, by driving the electric pump 22, the refrigerant circulates to return to the electric pump 22 via the water radiator 25, the water condenser 62, the heater core 21, the first three-way valve 51A, the battery BAT, the second three-way valve 52B, and the first three-way valve 51B. In the low temperature water circuit 30, by driving the electric pump 32, the refrigerant circulates to return to the electric pump 32 via the second three-way valve 52A, the in-vehicle charger 31, the drive device 33, the water heater 35, and the chiller 61.

The high temperature communication state is selected when it is necessary to heat the battery BAT.

Figure 11:
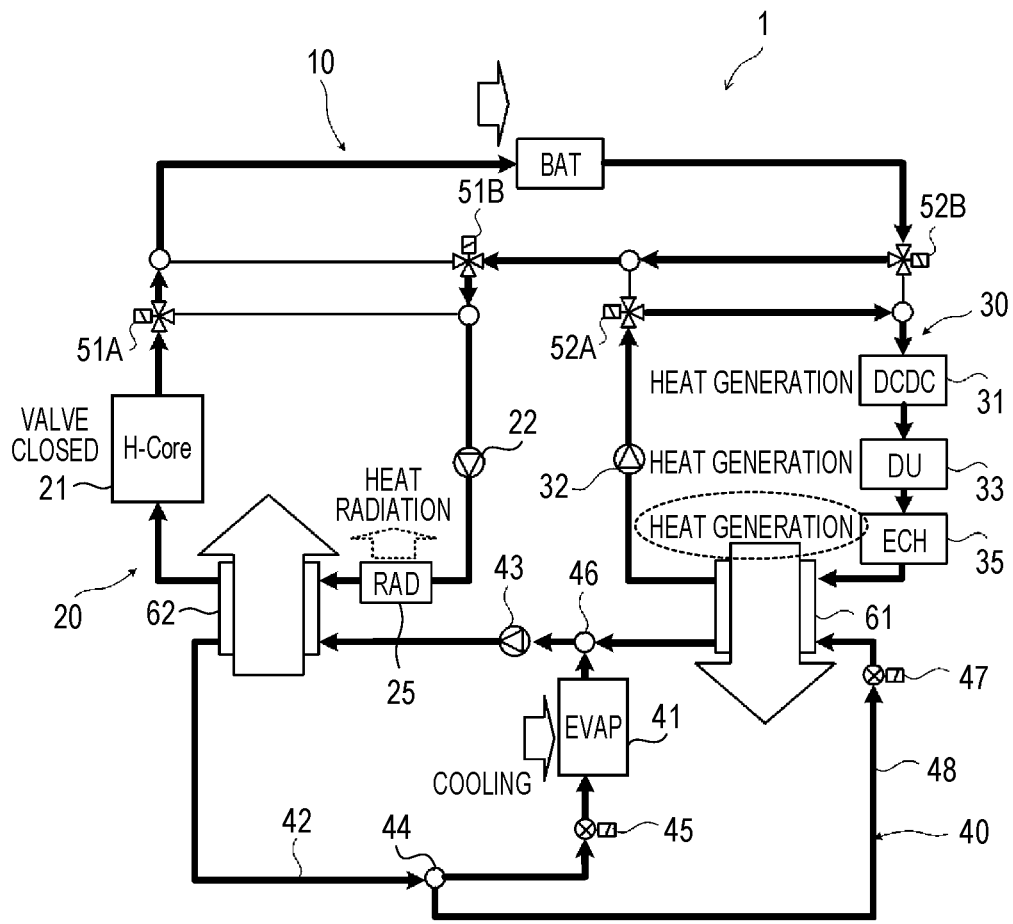
FIG. 11 is a circuit diagram of the temperature control system 1 showing a battery heating mode during cooling in a high temperature communication state.

In the high temperature communication state (during cooling) shown in FIG. 11, when a battery temperature is lower than the predetermined range, the electric pump 32 is driven to circulate the refrigerant in the low temperature water circuit 30. At this time, heat of the refrigerant is transferred to the refrigeration cycle circuit 40 by the chiller 61. The electric pump 22 is driven to circulate the refrigerant through the battery water circuit 10 and the high temperature water circuit 20 which communicate with each other. The heat transferred to the refrigeration cycle circuit 40 is transferred via the water condenser 62 to the battery water circuit 10 and the high temperature water circuit 20 which communicate with each other, warms the refrigerant in the high temperature water circuit 20, and heats the battery BAT.

Figure 12:
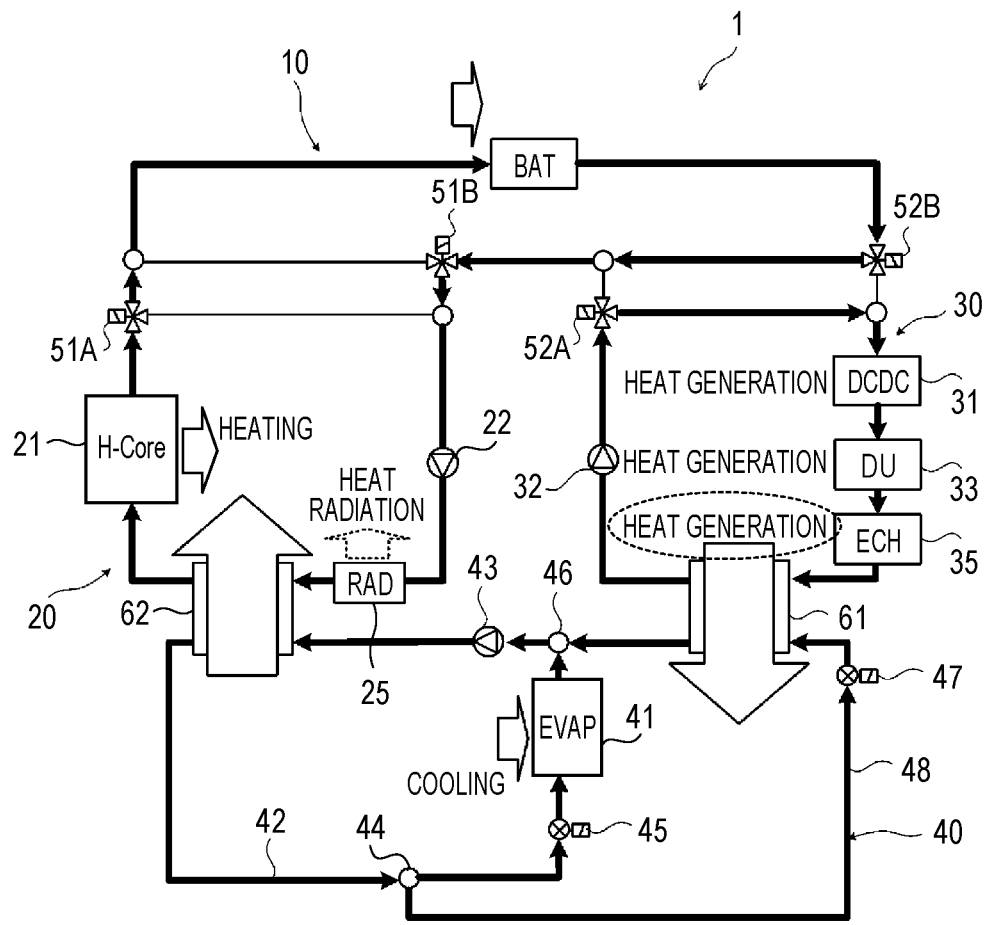
FIG. 12 is a circuit diagram of the temperature control system 1 showing a battery heating mode during dehumidification in the high temperature communication state.

In the high temperature communication state (during dehumidification) shown in FIG. 12, when a battery temperature is lower than the predetermined range, the electric pump 32 is driven to circulate the refrigerant in the low temperature water circuit 30. At this time, heat of the refrigerant is transferred to the refrigeration cycle circuit 40 by the chiller 61. The electric pump 22 is driven to circulate the refrigerant through the battery water circuit 10 and the high temperature water circuit 20 which communicate with each other. The heat transferred to the refrigeration cycle circuit 40 is transferred via the water condenser 62 to the battery water circuit 10 and the high temperature water circuit 20 which communicate with each other, warms the refrigerant in the high temperature water circuit 20, is used for heating by the heater core 21, and heats the battery BAT.

Figure 13:
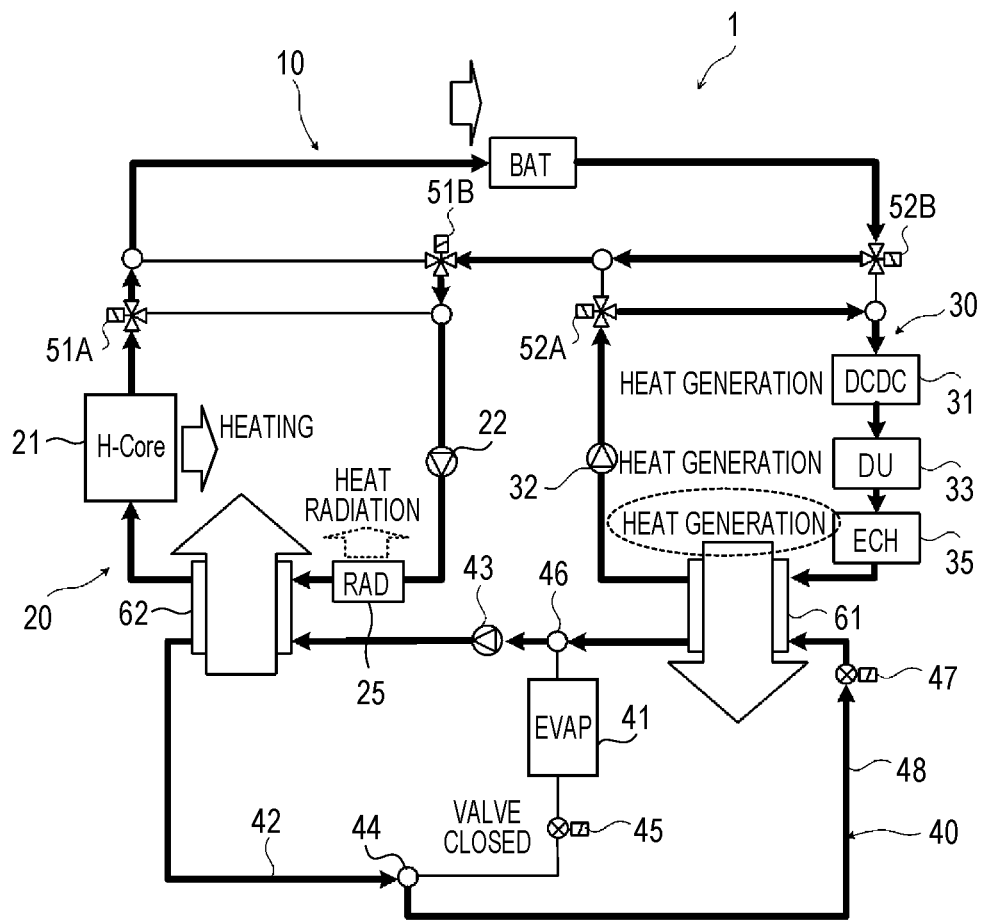
FIG. 13 is a circuit diagram of the temperature control system 1 showing a battery heating mode during heating in the high temperature communication state.

In the high temperature communication state (during heating) shown in FIG. 13, when a battery temperature is lower than the predetermined range, the electric pump 32 is driven to circulate the refrigerant in the low temperature water circuit 30. At this time, heat of the refrigerant is transferred to the refrigeration cycle circuit 40 by the chiller 61. The electric pump 22 is driven to circulate the refrigerant through the battery water circuit 10 and the high temperature water circuit 20 which communicate with each other. The heat transferred to the refrigeration cycle circuit 40 is transferred via the water condenser 62 to the battery water circuit 10 and the high temperature water circuit 20 which communicate with each other, warms the refrigerant in the high temperature water circuit 20, is used for heating by the heater core 21, and heats the battery BAT.

In the high temperature communication state (when the air conditioning is stopped) shown in FIG. 14, when a battery temperature is lower than the predetermined range, the electric pump 32 is driven to circulate the refrigerant in the low temperature water circuit 30. Here, when the battery temperature is lower than the predetermined range, the compressor 43 is operated and the expansion valve 47 is opened even when the air conditioning is stopped. Accordingly, the heat of the refrigerant in the low temperature water circuit 30 is transferred to the refrigeration cycle circuit 40 by the chiller 61. The electric pump 22 is driven to circulate the refrigerant through the battery water circuit 10 and the high temperature water circuit 20 which communicate with each other. The heat transferred to the refrigeration cycle circuit 40 is transferred to the high temperature water circuit 20 via the water condenser 62, warms the refrigerant in the high temperature water circuit 20, and heats the battery BAT. In this way, even when the air conditioning is stopped, the battery BAT can be actively heated by using the refrigeration cycle circuit 40.

In this way, in the high temperature communication state shown in FIGS. 11 to 14, the battery BAT can be heated by using the high temperature water circuit 20 for heating. Therefore, the temperature of the battery BAT can be increased quickly, and energy efficiency is improved. Even when the air conditioning is stopped as shown in FIG. 14, the battery BAT can be heated by using the refrigeration cycle circuit 40.

The low temperature water circuit 30 is a circuit for cooling the drive device 33 and the like, and thus when the chiller 61 is operated, exhaust heat of the drive device 33 is transferred to the high temperature water circuit 20 and the battery water circuit 10 which communicate with each other, via the low temperature water circuit 30, the chiller 61, the refrigeration cycle circuit 40, and the water condenser 62. Therefore, the exhaust heat of the drive device 33 can be used as a heat source during heating by the air conditioner and as a heat source for heating the battery BAT, and thus the energy efficiency can be improved.

The water heater 35 is provided in the low temperature water circuit 30 alone, and the heat generated by the water heater 35 can be transferred to the high temperature water circuit 20 and the battery water circuit 10 which communicate with each other, via the low temperature water circuit 30, the chiller 61, the refrigeration cycle circuit 40, and the water condenser 62. It is possible to shorten a time required for heating in an extremely low temperature environment or increasing a temperature of the battery.

By intentionally disposing the water heater 35 in the low temperature water circuit 30, it is possible to secure a water temperature for heating and/or heating the battery BAT through the battery water circuit 10 simply by increasing a temperature of the refrigerant slightly with a minimum output while using the exhaust heat of the drive device 33.

Further, the water radiator 25 is provided in the high temperature water circuit 20 alone, and the heat radiation to the outside air of the refrigeration cycle circuit 40 is performed by the water radiator 25 via the water condenser 62, and thus the heat radiation to the outside air can be collected in the water radiator 25 of the high temperature water circuit 20, and the air-cooled condenser of the refrigeration cycle circuit 40 can be eliminated.

Modification

In the above embodiment, four three-way valves, that is, the first three-way valves 51A and 51B and the second three-way valves 52A and 52B, are used to switch the full communication state, the high temperature communication state, the low temperature communication state, and the non-communication state of the temperature control system 1, but in the following modification, the full communication state, the high temperature communication state, the low temperature communication state, and the non-communication state of the temperature control system 1 is switched by one integration valve 60.

Figure 16:
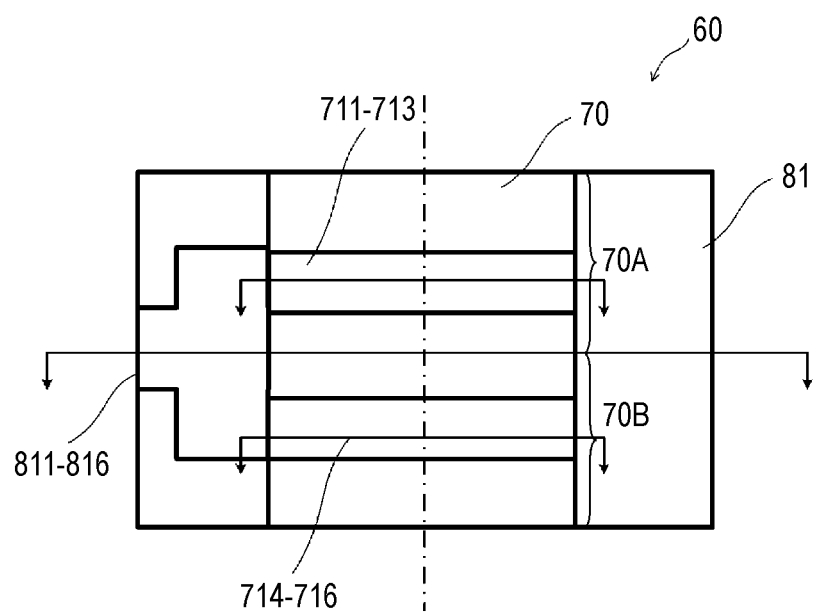
FIG. 16 is a longitudinal cross-sectional view of an integration valve 60.

FIG. 16 is a longitudinal cross-sectional view of the integration valve 60, and FIG. 17 is a diagram showing an A-A cross section, a B-B cross section, and a C-C cross section of FIG. 16.

The integration valve 60 includes a valve main body 70 and a housing 81 disposed on an outer peripheral portion of the valve main body 70. The valve main body 70 has a substantially cylindrical shape, and valve openings 720 to 731 are provided on an outer peripheral surface at every 30°. More specifically, the valve main body 70 includes a valve upper stage 70A and a valve lower stage 70B that rotate integrally, the valve openings 721, 723, 725, 727, 729, and 731 are provided on an outer peripheral surface of the valve upper stage 70A at every 60°, and the valve openings 720, 722, 724, 726, 728, and 730 are provided on an outer peripheral surface of the valve lower stage 70B at every 60°. The valve openings provided on the valve upper stage 70A and the valve openings provided on the valve lower stage 70B are shifted by 30°, so that the valve openings 720 to 731 are provided at every 30°.

The adjacent valve openings 721 and 723 formed on the valve upper stage 70A communicate with each other through an internal passage 713, the adjacent valve openings 725 and 727 communicate with each other through an internal passage 712, and the adjacent valve openings 729 and 731 communicate with each other through an internal passage 711. The internal passages 711 to 713 are independent from each other.

The two valve openings 720 and 726 formed on the valve lower stage 70B and located at 180° communicate with each other through an internal passage 714, the adjacent valve openings 728 and 730 located on one side across the internal passage 714 communicate with each other through an internal passage 715, and the adjacent valve openings 722 and 724 located on the other side across the internal passage 714 communicate with each other through an internal passage 716. The internal passages 714 to 716 are independent from each other.

The housing 81 has a cylindrical shape and is disposed around the valve main body 70 in a liquid-tight manner. Six ports 811, 812, 813, 814, 815, and 816 are arranged on an outer peripheral surface of the housing 81 at every 60°. Among the six ports 811 to 816, the battery water circuit 10 is connected to the adjacent ports 811 and 816, the low temperature water circuit 30 is connected to the adjacent ports 812 and 813, and the high temperature water circuit 20 is connected to the adjacent ports 814 and 815.

In the integration valve 60 configured in this way, by rotating the valve main body 70 by 300 with respect to the housing 81, the six ports 811 to 816 of the housing 81 and the internal passages 711 to 716 of the valve main body 70 selectively communicate with each other, whereby the battery water circuit 10, the high temperature water circuit 20, and the low temperature water circuit 30 selectively communicate with each other. Since the valve main body 70 is rotated by 30°, a situation in which the six ports 811 to 816 of the housing 81 communicate with the internal passages 711 to 713 of the valve upper stage 70A and a situation in which the six ports 811 to 816 of the housing 81 communicate with the internal passages 714 to 716 of the valve lower stage 70B occur alternately.

Hereinafter, an operation of the integration valve 60 will be described more specifically with reference to FIGS. 18 to 23. In each of FIGS. 18 to 23, a positional relationship between the valve upper stage 70A and the six ports 811 to 816 of the housing 81 is shown in an upper part, and a positional relationship between the valve lower stage 70B and the six ports 811 to 816 of the housing 81 is shown in a lower part.

Figure 18:
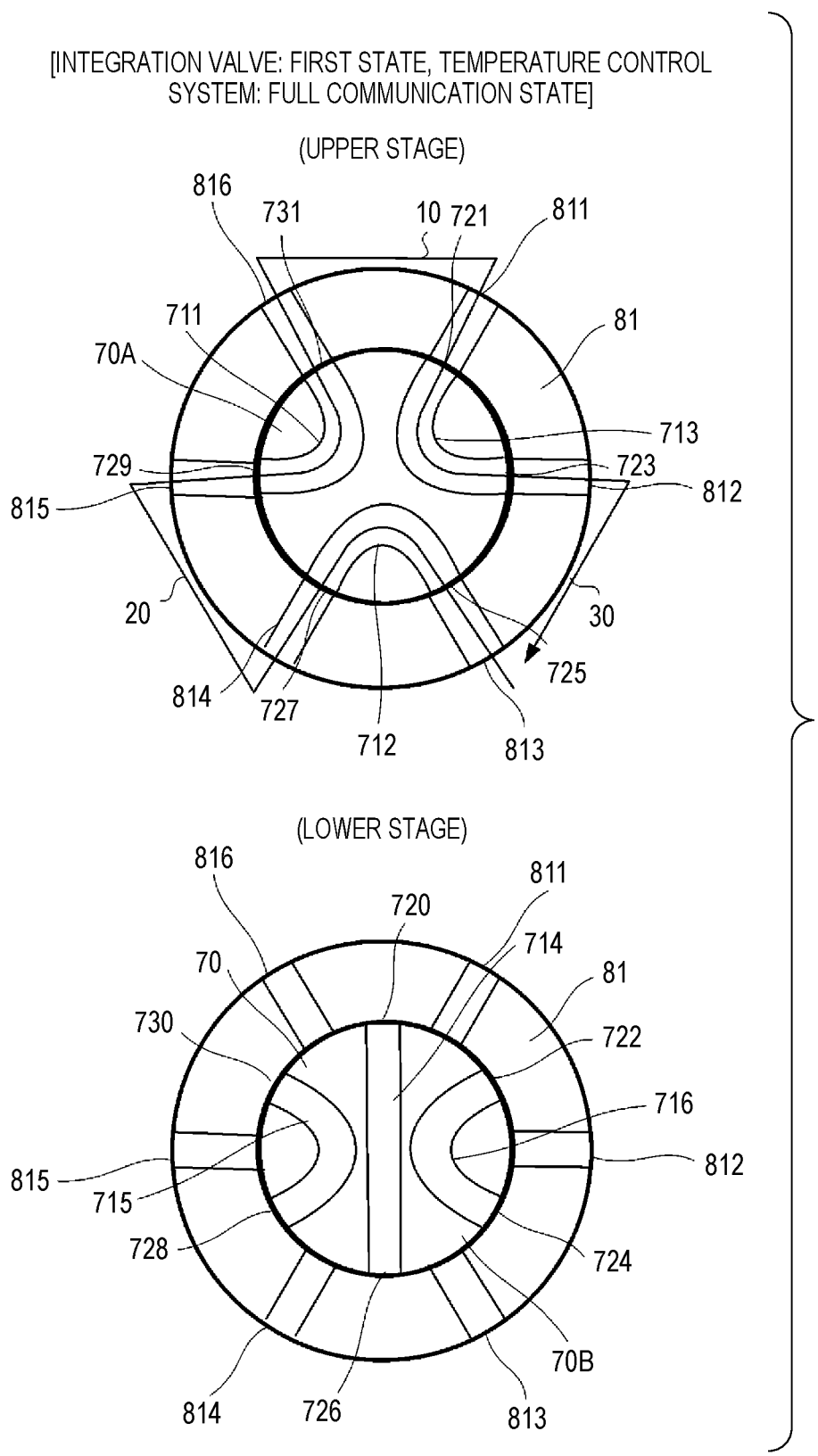
FIG. 18 is a diagram showing a first state of the integration valve 60 in which the temperature control system 1 is in the full communication state.

In a first state of the integration valve 60 shown in FIG. 18, the six ports 811 to 816 of the housing 81 communicate with the internal passages 711 to 713 of the valve upper stage 70A, and the battery water circuit 10 connected to the ports 811 and 816, the high temperature water circuit 20 connected to the ports 814 and 815, and the low temperature water circuit 30 connected to the ports 812 and 813 communicate with each other through the internal passages 711 to 713. The six ports 811 to 816 of the housing 81 and the internal passages 714 to 716 of the valve lower stage 70B do not communicate with each other, and all of the internal passages 714 to 716 are closed. Therefore, in the first state of the integration valve 60 shown in FIG. 18, the full communication state described in FIGS. 2 and 3 is achieved.

In a second state of the integration valve 60 shown in FIG. 19, the six ports 811 to 816 of the housing 81 communicate with the internal passages 714 to 716 of the valve lower stage 70B, the battery water circuit 10 connected to the ports 811 and 816 and the high temperature water circuit 20 connected to the ports 814 and 815 communicate with each other through the internal passages 714 and 715, and the low temperature water circuit 30 connected to the ports 812 and 813 is disconnected, by the internal passage 716, from the battery water circuit 10 and the high temperature water circuit 20 which communicate with each other. The six ports 811 to 816 of the housing 81 and the internal passages 711 to 713 of the valve upper stage 70A do not communicate with each other, and all of the internal passages 711 to 713 are closed. Therefore, in the second state of the integration valve 60 shown in FIG. 19, the high temperature communication state described in FIGS. 11 to 14 is achieved.

Figure 20:
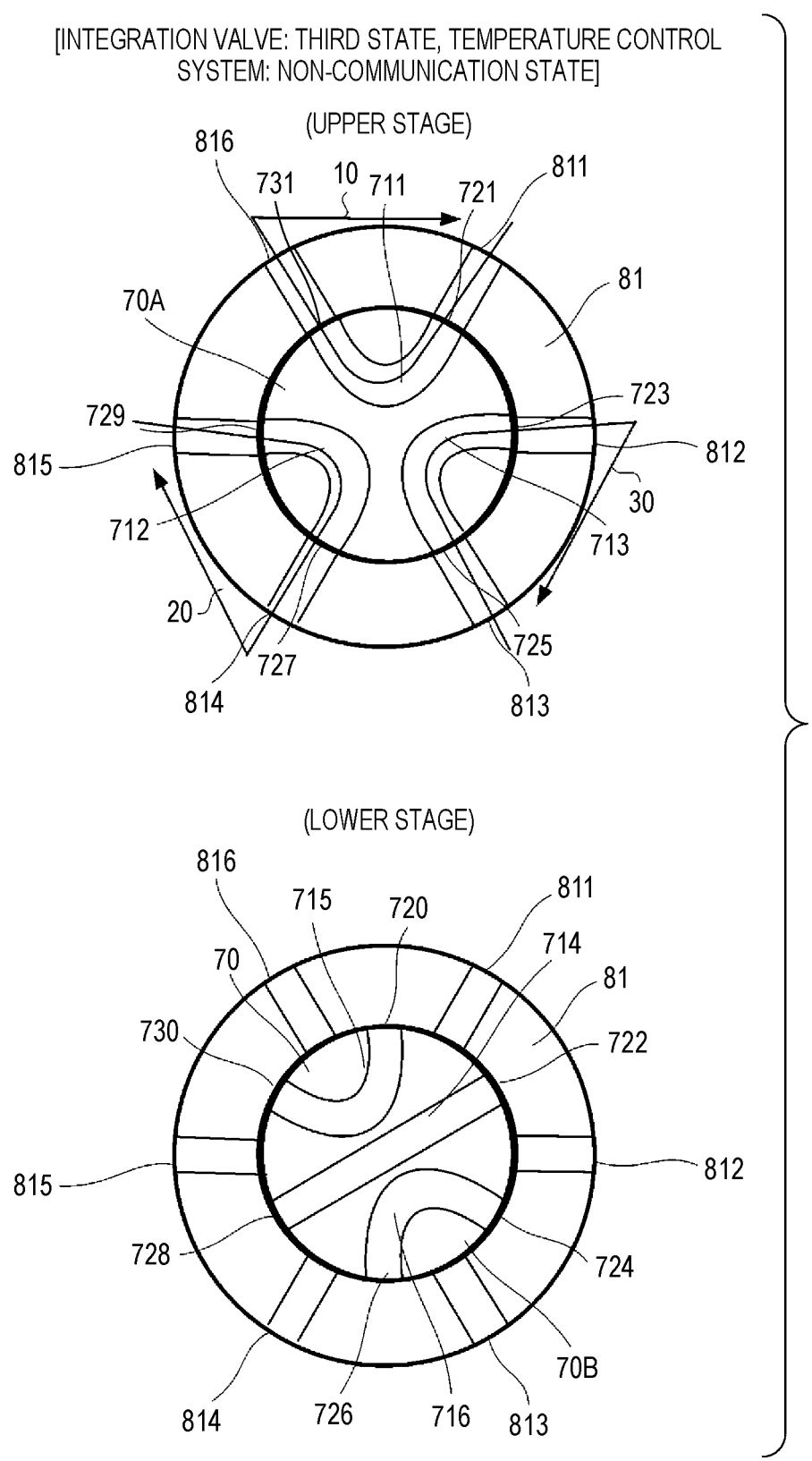
FIG. 20 is a diagram showing a third state of the integration valve 60 in which the temperature control system 1 is in the non-communication state.

In a third state of the integration valve 60 shown in FIG. 20, the six ports 811 to 816 of the housing 81 communicate with the internal passages 711 to 713 of the valve upper stage 70A, the battery water circuit 10 connected to the ports 811 and 816 is disconnected from the high temperature water circuit 20 and the low temperature water circuit 30 by the internal passage 711, the high temperature water circuit 20 connected to the ports 814 and 815 is disconnected from the battery water circuit 10 and the low temperature water circuit 30 by the internal passage 712, and the low temperature water circuit 30 connected to the ports 812 and 813 is disconnected from the battery water circuit 10 and the high temperature water circuit 20 by the internal passage 713. The six ports 811 to 816 of the housing 81 and the internal passages 714 to 716 of the valve lower stage 70B do not communicate with each other, and all of the internal passages 714 to 716 are closed. Therefore, in the third state of the integration valve 60 shown in FIG. 20, the non-communication state described in FIGS. 9 and 10 is achieved.

Figure 21:
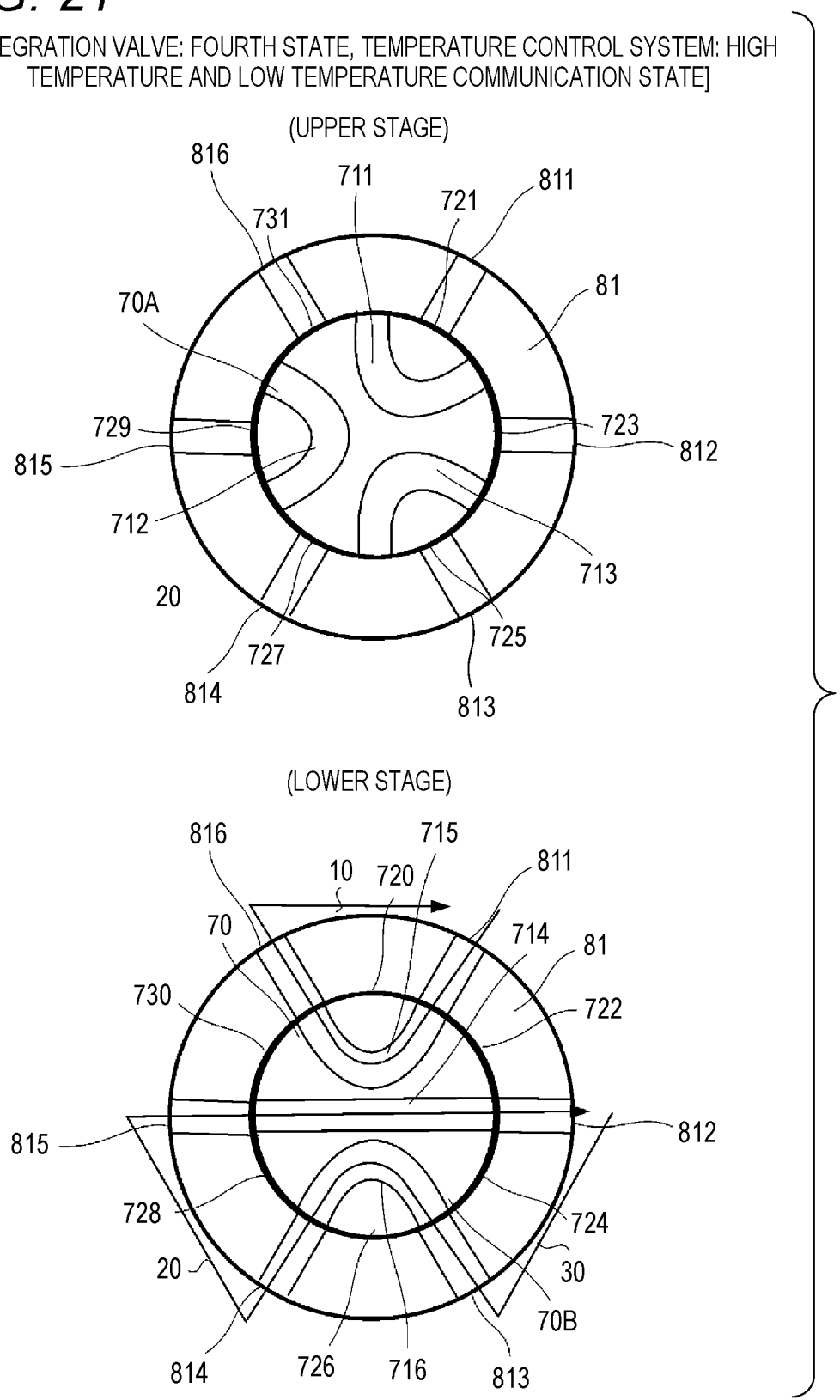
FIG. 21 is a diagram showing a fourth state of the integration valve 60 in which the temperature control system 1 is in a high temperature and low temperature communication state.

In a fourth state of the integration valve 60 shown in FIG. 21, the six ports 811 to 816 of the housing 81 communicate with the internal passages 714 to 716 of the valve lower stage 70B, the high temperature water circuit 20 connected to the ports 814 and 815 and the low temperature water circuit 30 connected to the ports 812 and 813 communicate with each other through the internal passages 714 and 716, and the battery water circuit 10 connected to the ports 811 and 816 is disconnected, by the internal passage 715, from the high temperature water circuit 20 and the low temperature water circuit 30 which communicate with each other. The six ports 811 to 816 of the housing 81 and the internal passages 711 to 713 of the valve upper stage 70A do not communicate with each other, and all of the internal passages 711 to 713 are closed. Therefore, in the fourth state of the integration valve 60 shown in FIG. 21, a high temperature and low temperature communication state that is not present in the above embodiment is achieved.

Figure 22:
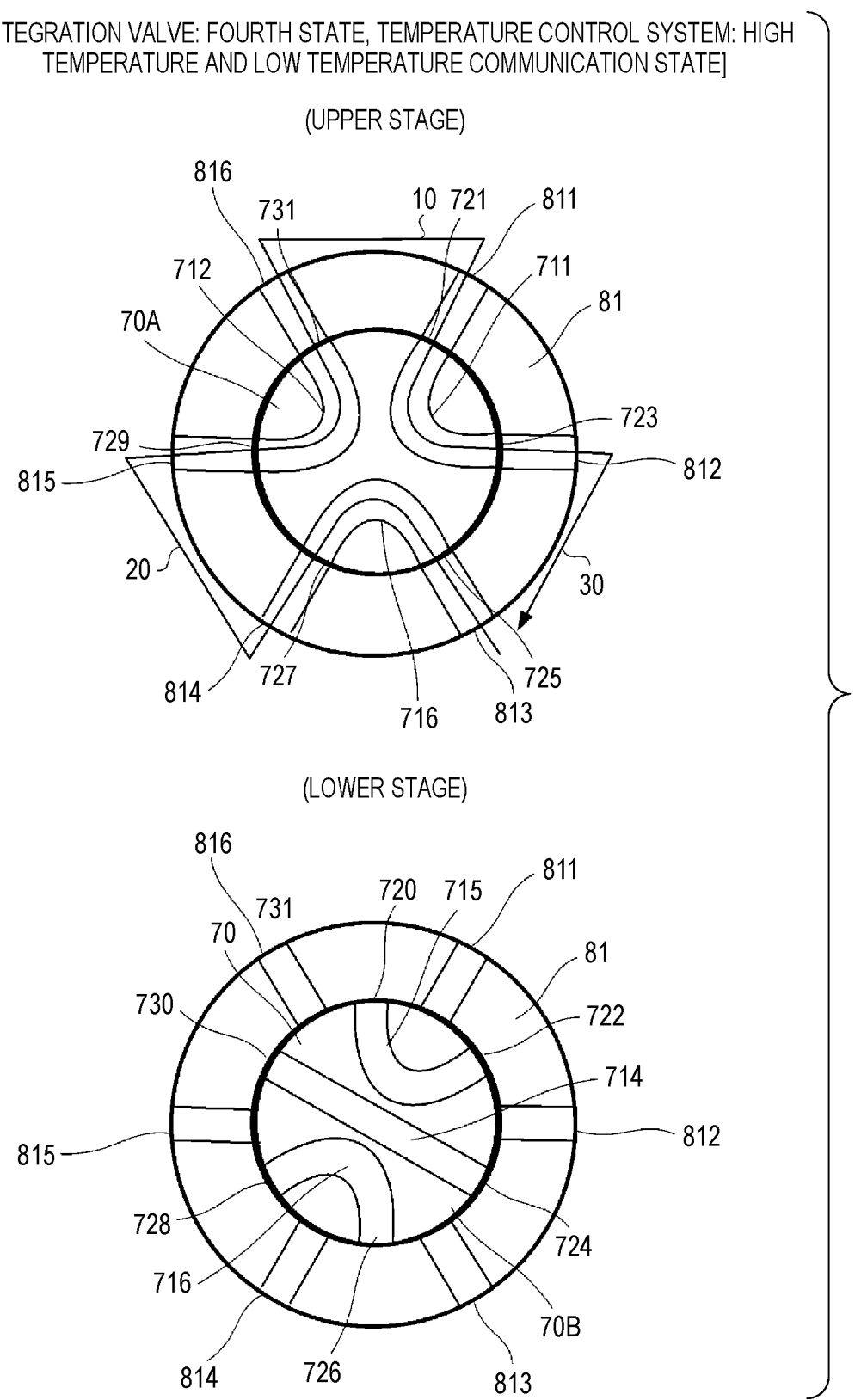
FIG. 22 is a diagram showing a fifth state of the integration valve 60 in which the temperature control system 1 is in the full communication state.

In a fifth state of the integration valve 60 shown in FIG. 22, the six ports 811 to 816 of the housing 81 communicate with the internal passages 711 to 713 of the valve upper stage 70A, and the battery water circuit 10 connected to the ports 811 and 816, the high temperature water circuit 20 connected to the ports 814 and 815, and the low temperature water circuit 30 connected to the ports 812 and 813 communicate with each other through the internal passages 711 to 713. The six ports 811 to 816 of the housing 81 and the internal passages 714 to 716 of the valve lower stage 70B do not communicate with each other, and all of the internal passages 714 to 716 are closed. Therefore, in the fifth state of the integration valve 60 shown in FIG. 22, the full communication state described in FIGS. 2 and 3 is achieved.

In a sixth state of the integration valve 60 shown in FIG. 23, the six ports 811 to 816 of the housing 81 communicate with the internal passages 714 to 716 of the valve lower stage 70B, the battery water circuit 10 connected to the ports 811 and 816 and the low temperature water circuit 30 connected to the ports 812 and 813 communicate with each other through the internal passages 714 and 715, and the high temperature water circuit 20 connected to the ports 814 and 815 is disconnected, by the internal passage 716, from the battery water circuit 10 and the low temperature water circuit 30 which communicate with each other. The six ports 811 to 816 of the housing 81 and the internal passages 711 to 713 of the valve upper stage 70A do not communicate with each other, and all of the internal passages 711 to 713 are closed. Therefore, in the sixth state of the integration valve 60 shown in FIG. 23, the low temperature communication state described in FIGS. 4 to 7 is achieved.

When the valve main body 70 is further rotated by 30° with respect to the housing 81, the state transitions to the first state, the second state, the third state, and so on. FIG. 24 is a table summarizing the states of the integration valve 60 and the modes.

Although various embodiments have been described above with reference to the drawings, it is needless to say that the present invention is not limited to the examples. It is apparent that those skilled in the art may conceive of various modifications and changes within the scope described in the claims, and it is understood that such modifications and changes naturally fall within the technical scope of the present invention. In addition, respective constituent elements in the above embodiment may be freely combined without departing from the gist of the invention.

In the present description, at least the following matters are described.

Corresponding constituent elements and the like in the above embodiment are shown in parentheses, but the present invention is not limited thereto.

(1) A temperature control system (temperature control system 1) for a battery (battery BAT) mounted on a vehicle, the temperature control system including:
 a battery temperature control circuit (battery water circuit 10) configured to allow a refrigerant to flow therethrough and adjust a temperature of the battery;
 a high temperature refrigerant circuit (high temperature water circuit 20) configured to radiate heat from the refrigerant to heat the vehicle;
 a low temperature refrigerant circuit (low temperature water circuit 30) configured to absorb heat from a heat generating component (in-vehicle charger 31) different from the battery into the refrigerant;
 a refrigeration cycle circuit (refrigeration cycle circuit 40) used for an air conditioner of the vehicle;
 a first valve mechanism (first three-way valve 51A, 51B, integration valve 60) configured to switch between a high temperature side connection state in which the battery temperature control circuit and the high temperature refrigerant circuit communicate with each other and a high temperature side disconnection state in which the battery temperature control circuit and the high temperature refrigerant circuit are disconnected;
 a second valve mechanism (second three-way valve 52A, 52B, integration valve 60) configured to switch between a low temperature side connection state in which the battery temperature control circuit and the low temperature refrigerant circuit communicate with each other and a low temperature side disconnection state in which the battery temperature control circuit and the low temperature refrigerant circuit are disconnected;
 a first heat exchanger (chiller 61) configured to transfer heat from the low temperature refrigerant circuit to the refrigeration cycle circuit; and
 a second heat exchanger (water condenser 62) configured to transfer heat from the refrigeration cycle circuit to the high temperature refrigerant circuit,
 in which the battery is a solid-state battery,
 the first valve mechanism and the second valve mechanism are switchable to a high temperature communication state in which the battery temperature control circuit and the high temperature refrigerant circuit communicate with each other and the low temperature refrigerant circuit is disconnected from the battery temperature control circuit and the high temperature refrigerant circuit which communicate with each other, by setting the low temperature side disconnection state and the high temperature side connection state, and in the high temperature communication state, the refrigerant flowing through the battery passes through the second heat exchanger, and the refrigerant flowing through the heat generating component passes through the first heat exchanger.

According to (1), the high temperature refrigerant circuit for heating can be used for heating a battery made of a solid-state battery having a high temperature range, and thus a temperature of the battery can be increased quickly, and energy efficiency is improved.

(2) The temperature control system according to (1),
in which the first valve mechanism and the second valve mechanism are switchable between:
  a full communication state in which all of the battery temperature control circuit, the high temperature refrigerant circuit, and the low temperature refrigerant circuit communicate with each other, by setting the low temperature side connection state and the high temperature side connection state;
  the high temperature communication state in which the battery temperature control circuit and the high temperature refrigerant circuit communicate with each other and the low temperature refrigerant circuit is disconnected from the battery temperature control circuit and the high temperature refrigerant circuit which communicate with each other, by setting the low temperature side disconnection state and the high temperature side connection state;
  a low temperature communication state in which the battery temperature control circuit and the low temperature refrigerant circuit communicate with each other and the high temperature refrigerant circuit is disconnected from the battery temperature control circuit and the low temperature refrigerant circuit which communicate with each other, by setting the low temperature side connection state and the high temperature side disconnection state; and
  a non-communication state in which all communication of the battery temperature control circuit, the high temperature refrigerant circuit, and the low temperature refrigerant circuit is disconnected, by setting the low temperature side disconnection state and the high temperature side disconnection state.

According to (2), even when heating the battery is not required, by switching between communication and disconnection of the first valve mechanism and the second valve mechanism, it is possible to achieve both an appropriate temperature for the battery and a temperature required for air conditioning. In addition, reservoir tanks can be integrated by having a mode in which all of the refrigerant circuits (battery temperature control circuit, high temperature refrigerant circuit, and low temperature refrigerant circuit) can be connected.

(3) The temperature control system according to (2),
in which the first valve mechanism and the second valve mechanism establish the full communication state when the air conditioner is stopped.

According to (3), it is possible to control the temperature of the battery even when the air conditioner is stopped.

(4) The temperature control system according to (1),
in which a water heater (water heater 35) is provided in the low temperature refrigerant circuit alone.

According to (4), heat generated by the water heater can be transferred to the high temperature refrigerant circuit and the battery temperature control circuit which communicate with each other, via the low temperature refrigerant circuit, the first heat exchanger, the refrigeration cycle circuit, and the second heat exchanger, and it is possible to shorten a time required for heating in an extremely low temperature environment or increasing the temperature of the battery. In addition, by intentionally disposing the water heater in the low temperature refrigerant circuit, it is possible to ensure a water temperature for heating and/or a water temperature for heating the battery through the refrigeration cycle circuit simply by increasing a temperature of the refrigerant slightly with a minimum output.

(5) The temperature control system according to (1),
in which a water radiator (water radiator 25) is provided in the high temperature refrigerant circuit alone, and
heat radiation of the refrigeration cycle circuit to outside air is performed by the water radiator via the second heat exchanger.

According to (5), the heat radiation to the outside air can be collected in the water radiator of the high temperature refrigerant circuit, and an air-cooled condenser of the refrigeration cycle circuit can be eliminated.

(6) The temperature control system according to (1),
in which the low temperature refrigerant circuit is configured to cool a drive device (drive device 33),
a heat source during heating by the air conditioner includes the drive device, and
exhaust heat of the drive device is used in a heater core (heater core 21) of the high temperature refrigerant circuit via the first heat exchanger, the refrigeration cycle circuit, and the second heat exchanger.

According to (6), the energy efficiency is improved by using the exhaust heat of the drive device during heating.

(7) The temperature control system according to (1),
in which the first valve mechanism and the second valve mechanism correspond to a single valve device (integration valve 60) having six ports (ports 811 to 816) and six internal passages (internal passages 711 to 716).

According to (7), the first valve mechanism and the second valve mechanism can be collected in a single valve device.

(8) The temperature control system according to (7),
in which the valve device includes a valve main body (valve main body 70) and a housing (housing 81) disposed on an outer peripheral portion of the valve main body,
the valve main body is provided with valve openings (valve openings 720 to 731) at every 30°,
each of the six internal passages communicates with two of the valve openings,
the six ports are arranged on the housing at every 60°,
the valve main body is to be rotated by 30° with respect to the housing, and
the valve device is switchable between:
  a full communication state in which all of the battery temperature control circuit, the high temperature refrigerant circuit, and the low temperature refrigerant circuit communicate with each other;
  the high temperature communication state in which the battery temperature control circuit and the high temperature refrigerant circuit communicate with each other and the low temperature refrigerant circuit is disconnected;
  a low temperature communication state in which the battery temperature control circuit and the low temperature refrigerant circuit communicate with each other and the high temperature refrigerant circuit is disconnected; and
  a non-communication state in which all of the battery temperature control circuit, the high temperature refrigerant circuit, and the low temperature refrigerant circuit are disconnected.

According to (8), the four states of the temperature control system can be switched by rotating the valve main body, and valve control is simplified.

What is claimed is:

1. A temperature control system for a battery mounted on a vehicle, the temperature control system comprising:
    a battery temperature control circuit configured to allow a refrigerant to flow therethrough and adjust a temperature of the battery;
    a high temperature refrigerant circuit configured to radiate heat from the refrigerant to heat the vehicle;
    a low temperature refrigerant circuit configured to absorb heat from a heat generating component different from the battery into the refrigerant;
    a refrigeration cycle circuit used for an air conditioner of the vehicle;
    a first valve mechanism configured to switch between a high temperature side connection state in which the battery temperature control circuit and the high temperature refrigerant circuit communicate with each other and a high temperature side disconnection state in which the battery temperature control circuit and the high temperature refrigerant circuit are disconnected;
    a second valve mechanism configured to switch between a low temperature side connection state in which the battery temperature control circuit and the low temperature refrigerant circuit communicate with each other and a low temperature side disconnection state in which the battery temperature control circuit and the low temperature refrigerant circuit are disconnected;
    a first heat exchanger configured to transfer heat from the low temperature refrigerant circuit to the refrigeration cycle circuit; and
    a second heat exchanger configured to transfer heat from the refrigeration cycle circuit to the high temperature refrigerant circuit,
    wherein the battery is a solid-state battery,
    the first valve mechanism and the second valve mechanism are switchable to a high temperature communication state in which the battery temperature control circuit and the high temperature refrigerant circuit communicate with each other and the low temperature refrigerant circuit is disconnected from the battery temperature control circuit and the high temperature refrigerant circuit which communicate with each other, by setting the low temperature side disconnection state and the high temperature side connection state, and
    in the high temperature communication state, the refrigerant flowing through the battery passes through the second heat exchanger, and the refrigerant flowing through the heat generating component passes through the first heat exchanger.

2. The temperature control system according to claim 1, wherein the first valve mechanism and the second valve mechanism are switchable between:
    a full communication state in which all of the battery temperature control circuit, the high temperature refrigerant circuit, and the low temperature refrigerant circuit communicate with each other, by setting the low temperature side connection state and the high temperature side connection state;
    the high temperature communication state in which the battery temperature control circuit and the high temperature refrigerant circuit communicate with each other and the low temperature refrigerant circuit is disconnected from the battery temperature control circuit and the high temperature refrigerant circuit which communicate with each other, by setting the low temperature side disconnection state and the high temperature side connection state;
    a low temperature communication state in which the battery temperature control circuit and the low temperature refrigerant circuit communicate with each other and the high temperature refrigerant circuit is disconnected from the battery temperature control circuit and the low temperature refrigerant circuit which communicate with each other, by setting the low temperature side connection state and the high temperature side disconnection state; and
    a non-communication state in which all communication of the battery temperature control circuit, the high temperature refrigerant circuit, and the low temperature refrigerant circuit is disconnected, by setting the low temperature side disconnection state and the high temperature side disconnection state.

3. The temperature control system according to claim 2, wherein the first valve mechanism and the second valve mechanism establish the full communication state when the air conditioner is stopped.

4. The temperature control system according to claim 1, wherein a water heater is provided in the low temperature refrigerant circuit alone.

5. The temperature control system according to claim 1, wherein a water radiator is provided in the high temperature refrigerant circuit alone, and
    heat radiation of the refrigeration cycle circuit to outside air is performed by the water radiator via the second heat exchanger.

6. The temperature control system according to claim 1, wherein the low temperature refrigerant circuit is configured to cool a drive device,
    a heat source during heating by the air conditioner includes the drive device, and
    exhaust heat of the drive device is used in a heater core of the high temperature refrigerant circuit via the first heat exchanger, the refrigeration cycle circuit, and the second heat exchanger.

7. The temperature control system according to claim 1, wherein the first valve mechanism and the second valve mechanism correspond to a single valve device having six ports and six internal passages.

8. The temperature control system according to claim 7, wherein the valve device includes a valve main body and a housing disposed on an outer peripheral portion of the valve main body,
    the valve main body is provided with valve openings at every 30°,
    each of the six internal passages communicates with two of the valve openings,
    the six ports are arranged on the housing at every 60°,
    the valve main body is to be rotated by 30° with respect to the housing, and
    the valve device is switchable between:
        a full communication state in which all of the battery temperature control circuit, the high temperature refrigerant circuit, and the low temperature refrigerant circuit communicate with each other;
        the high temperature communication state in which the battery temperature control circuit and the high temperature refrigerant circuit communicate with each other and the low temperature refrigerant circuit is disconnected;

a low temperature communication state in which the battery temperature control circuit and the low temperature refrigerant circuit communicate with each other and the high temperature refrigerant circuit is disconnected; and
a non-communication state in which all of the battery temperature control circuit, the high temperature refrigerant circuit, and the low temperature refrigerant circuit are disconnected.

* * * * *